US008044997B2

(12) United States Patent
Masuda et al.

(10) Patent No.: US 8,044,997 B2
(45) Date of Patent: Oct. 25, 2011

(54) METHOD, APPARATUS, AND PROGRAM FOR PROCESSING STEREOSCOPIC VIDEOS

(75) Inventors: Tomonori Masuda, Miyagi (JP); Mikio Watanabe, Miyagi (JP); Takeshi Ota, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 437 days.

(21) Appl. No.: 12/410,816

(22) Filed: Mar. 25, 2009

(65) Prior Publication Data

US 2009/0244268 A1 Oct. 1, 2009

(30) Foreign Application Priority Data

Mar. 26, 2008 (JP) ................................ 079633/2008

(51) Int. Cl.
*H04N 13/04* (2006.01)
(52) U.S. Cl. .......................................... 348/51; 345/419
(58) Field of Classification Search .................. 348/42, 348/51; 345/419
See application file for complete search history.

(56) References Cited

U.S. PATENT DOCUMENTS

| 6,678,323 B2 * | 1/2004 | Tam et al. ............. 375/240.03 |
| 2009/0027384 A1 * | 1/2009 | Karman et al. ............ 345/419 |
| 2010/0253679 A1 * | 10/2010 | Vyakhirev .................. 345/419 |

FOREIGN PATENT DOCUMENTS

| JP | 10-40420 A | 2/1998 |
| JP | 10-172004 A | 6/1998 |
| JP | 11-164328 A | 6/1999 |
| JP | 2004-200813 A | 7/2004 |
| JP | 2004-235942 A * | 8/2004 |
| JP | 2004-328566 A | 11/2004 |
| JP | 2005-109568 A | 4/2005 |

OTHER PUBLICATIONS

Office Action issued on Sep. 28, 2010 for Japanese Application No. 2008-079633.

* cited by examiner

*Primary Examiner* — Moustafa M Meky

(74) *Attorney, Agent, or Firm* — Birch, Stewart, Kolasch & Birch, LLP

(57) ABSTRACT

A stereoscopic video processing apparatus is constituted by: a video input section, for receiving input of stereoscopic videos constituted by a plurality of frames, which are viewable stereoscopically; a scene detecting section, for detecting positions within the stereoscopic videos at which scene changes occur; and a perceived depth adjusting section, for administering perceived depth adjusting processes that adjust the perceived depths of the stereoscopic videos such that the perceived depth changes gradually at the positions at which scene changes occur.

16 Claims, 14 Drawing Sheets

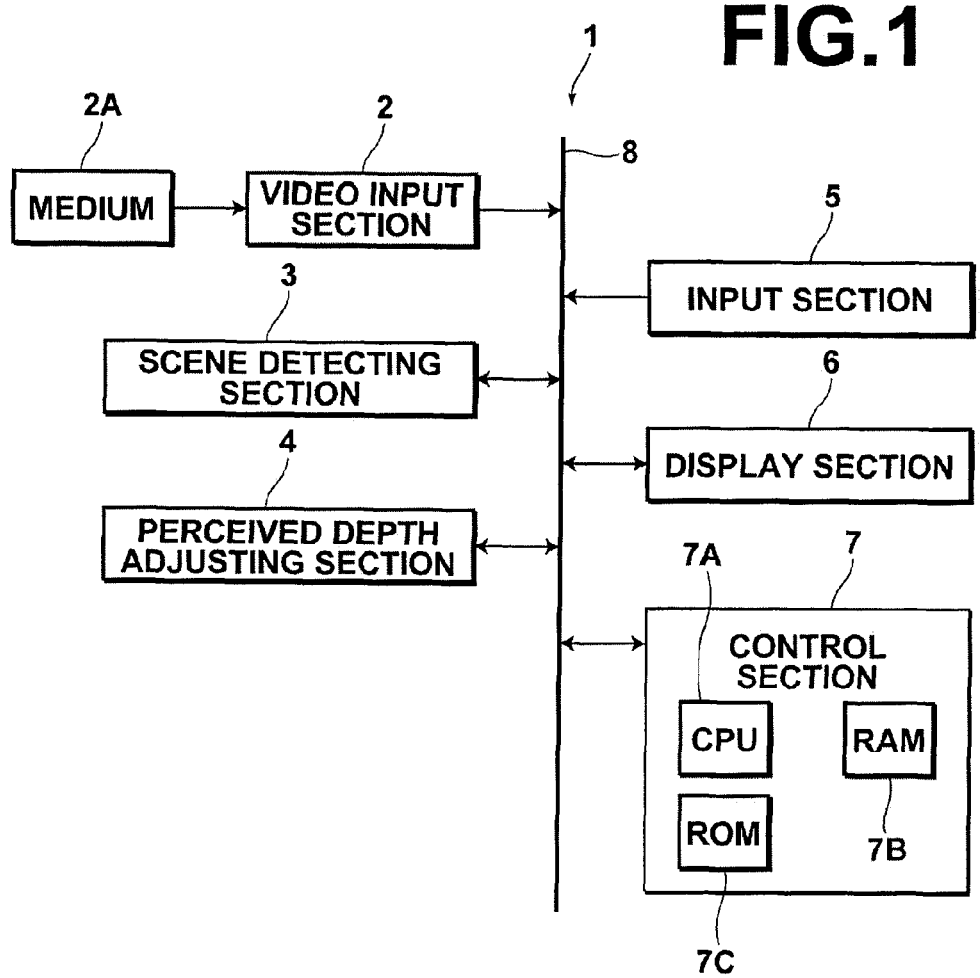
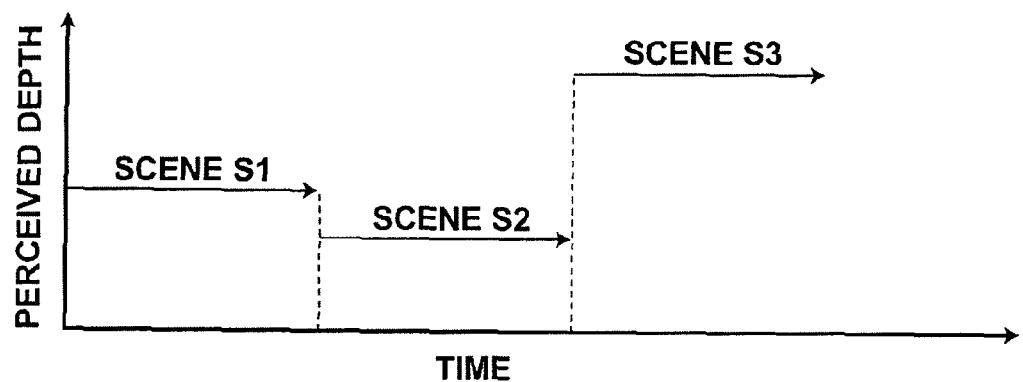

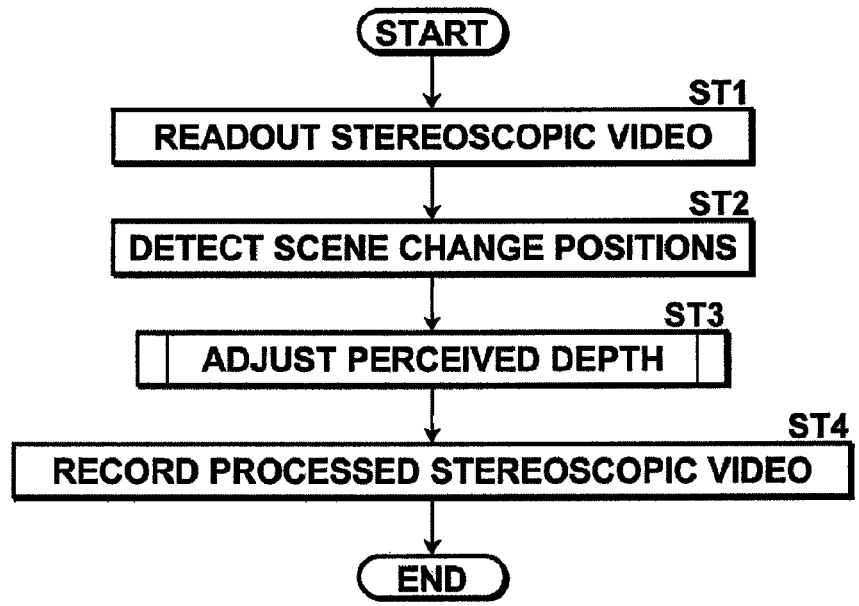
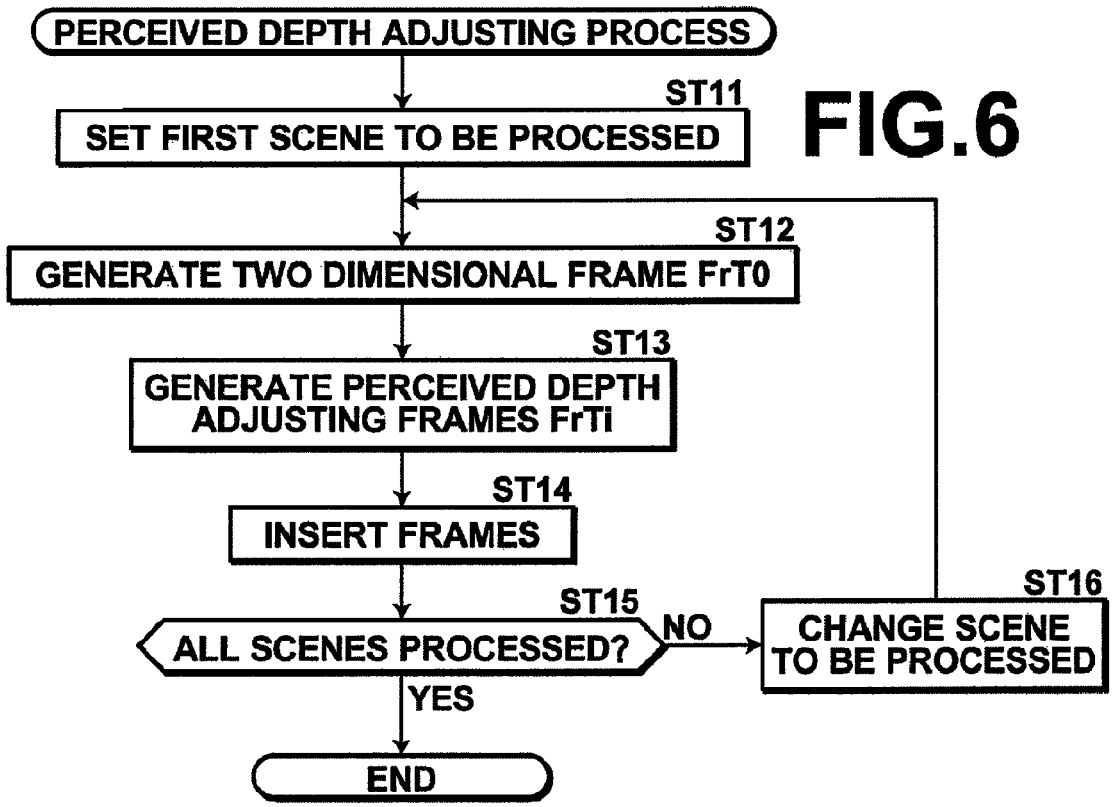

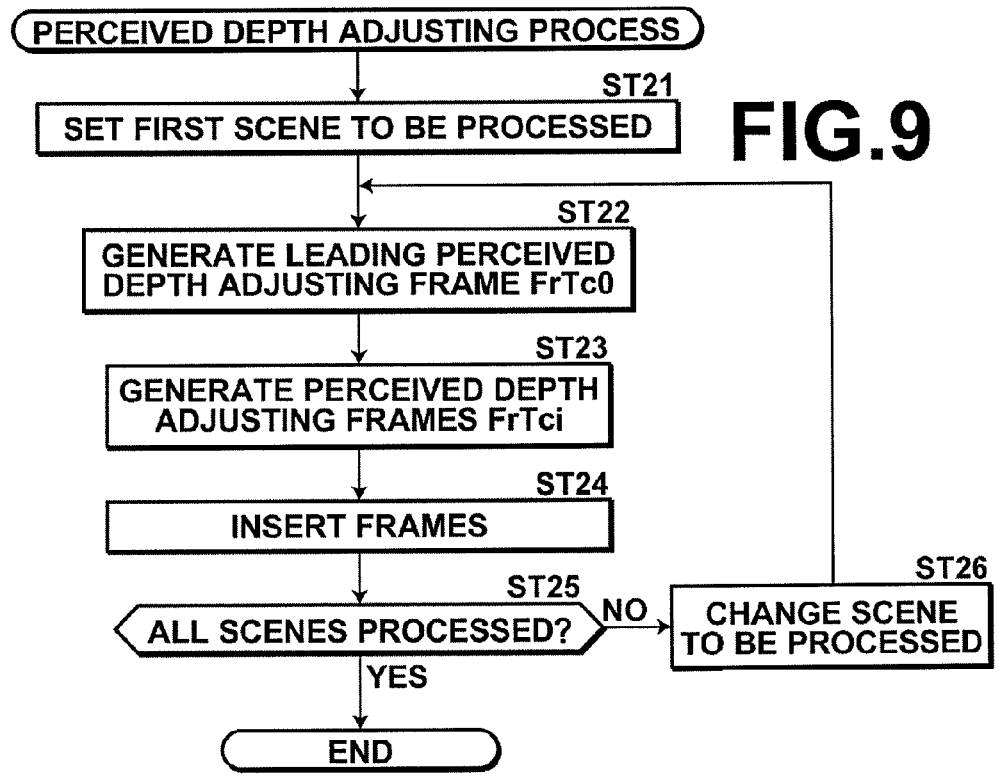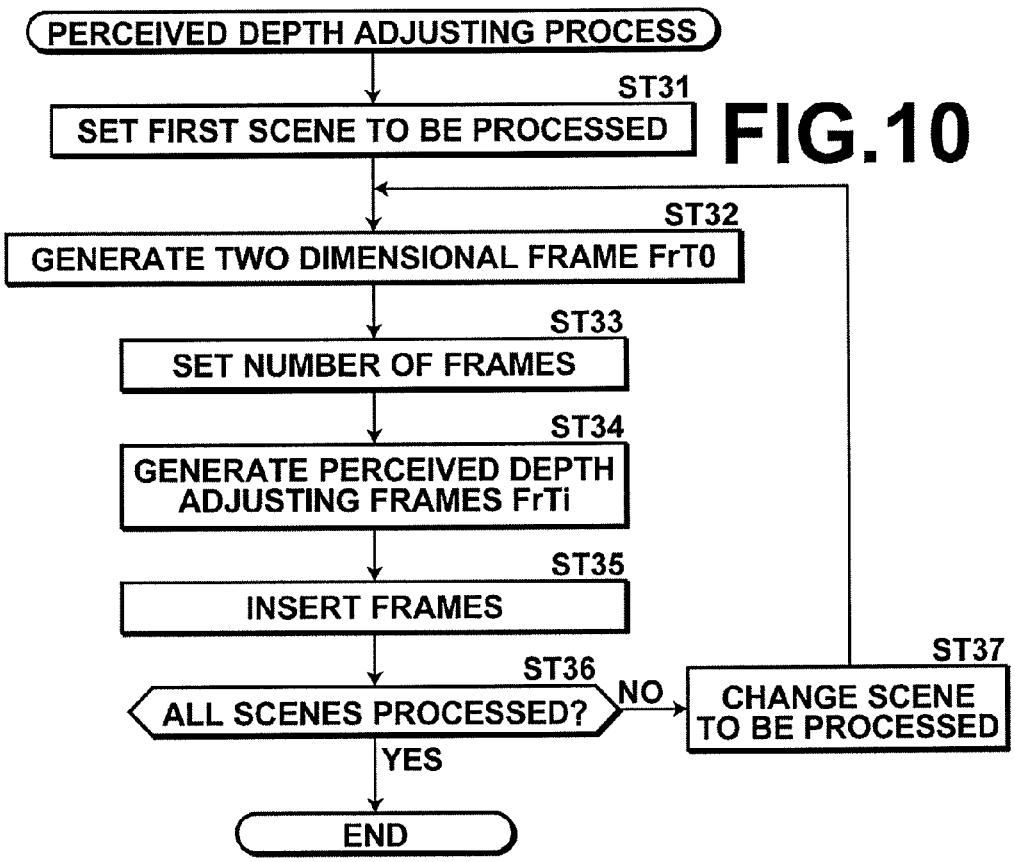

METHOD, APPARATUS, AND PROGRAM FOR PROCESSING STEREOSCOPIC VIDEOS

BACKGROUND OF THE INVENTION

1. Field of the Invention

The present invention is related to a stereoscopic video processing method and a stereoscopic video processing apparatus for processing stereoscopic videos. The present invention is also related to a program that causes a computer to execute the stereoscopic video processing method.

2. Description of the Related Art

It is known that stereoscopic viewing that utilizes parallax is enabled by combining and displaying a plurality of images. Stereoscopic images that enable stereoscopic viewing may be generated by obtaining a plurality of images of a single subject using a plurality of cameras at different positions, then combining a plurality of images utilizing the parallax of the subject included in the plurality of images.

Specifically, stereoscopic images may be generated by causing colors in the plurality of images to be different, such as red and blue, then overlapping the images. Alternatively, stereoscopic images may be generated by causing the polarization directions to be different within the plurality of images, then overlapping the images. In these cases, stereoscopic images can be viewed three dimensionally, by viewers' eyes stereoscopically viewing the stereoscopic images, which are displayed using red/blue glasses or polarizing glasses, using the automatic focusing function of the eyes (the anaglyph method and the polarizing filter method).

It is also possible to view stereoscopic images three dimensionally without using polarizing glasses and the like. The parallax barrier method and the lenticular method enable stereoscopic images to be viewed three dimensionally, by displaying the stereoscopic images on a three dimensional liquid crystal display. In these cases, the stereoscopic images are generated by cutting the plurality of images into vertically extending stripes, which are then arranged alternately. Another example of a stereoscopic display method is the time division method, in which the light beam directions of left and right images are changed by the use of image separating glasses or by attaching optical elements to liquid crystal displays, and displaying the right and left images alternately.

A technique for setting the type of display to be performed in advance when reproducing stereoscopic videos has been proposed (refer to Japanese Unexamined Patent Publication No. 2004-200813). According to the technique disclosed in Japanese Unexamined Patent Publication No. 2004-200813, settings may be set such that a two dimensional video which cannot be viewed three dimensionally is displayed for the first several seconds, and then display is switched to stereoscopic display.

A technique for resolving disorientation experienced by viewers during switching between three dimensional display of stereoscopic videos and two dimensional videos, which cannot be viewed three dimensionally, in cases that both types of images are present, has also been proposed (refer to Japanese Unexamined Patent Publication No. 2004-328566). According to the technique disclosed in Japanese Unexamined Patent Publication No. 2004-328566, switching between three dimensional display and two dimensional display is performed gradually, in order to reduce disorientation experienced by viewers.

When stereoscopic videos are filmed, scenes change when operations such as initiation of filming, cessation of filming, change of zoom magnification rates, and the like are performed. As a result, the perceived depth changes prior to and after positions within the stereoscopic videos at which scene changes occur. However, in three dimensional viewing, depth perception is realized by the automatic focusing function of viewers' eyes. Therefore, viewers will become extremely fatigued if the perceived depths of scenes switch suddenly. The technique disclosed in Japanese Unexamined Patent Publication No. 2004-200813 sets the manner in which two dimensional videos and stereoscopic videos are to be displayed in advance. Therefore, this technique cannot be applied to scene switching within stereoscopic videos. The technique disclosed in Japanese Unexamined Patent Publication No. 2004-328566 switches between three dimensional display of stereoscopic videos and two dimensional display of to dimensional videos gradually. Therefore, this technique cannot be applied to scene switching within stereoscopic videos.

SUMMARY OF THE INVENTION

The present invention has been developed in view of the foregoing circumstances. It is an object of the present invention to reduce fatigue in users who stereoscopically view stereoscopic videos during switching among scenes in stereoscopic videos.

A stereoscopic video processing apparatus according to the present invention is characterized by comprising:

video input means, for receiving input of stereoscopic videos constituted by a plurality of frames, which are viewable stereoscopically;

scene detecting means, for detecting positions within the stereoscopic videos at which scene changes occur; and perceived depth adjusting means, for administering perceived depth adjusting processes that adjust the perceived depths of the stereoscopic videos such that the perceived depth changes gradually at the positions at which scene changes occur.

Note that the perceived depth adjusting process administered by the perceived depth adjusting means may be a process comprising the steps of:

displaying a two dimensional frame corresponding to the leading frame of a scene to be processed following the last frame of a preceding scene;

displaying a number of perceived depth adjusting frames, in which the perceived depth changes continuously from that of the two dimensional frame to the leading frame; and displaying the leading frame and the frames following thereafter, after the perceived depth adjusting frames are displayed.

In this case, the perceived depth adjusting means may increase the number of perceived depth adjusting frames as the perceived depth of the leading frame is greater.

The term "two dimensional frame" is a frame having a perceived depth value of approximately 0. The two dimensional frame may be generated by morphing the leading frame or the like, such that the parallax between corresponding pixels included in the leading frame are eliminated. Note that a stereoscopic video is a plurality of videos which are combined such that they can be viewed three dimensionally. Therefore, if the plurality of videos prior to being combined are input along with the stereoscopic videos, a video prior to being combined may be employed to generate the two dimensional frame.

Alternatively, the perceived depth adjusting process administered by the perceived depth adjusting means may be a process comprising the steps of:

displaying a leading perceived depth adjusting frame corresponding to one of the last frame of a scene preceding a scene to be processed and the leading frame of the scene to be processed, having a perceived depth corresponding to the perceived depth of the last frame of the scene preceding the scene to be processed;

displaying a number of perceived depth adjusting frames, in which the perceived depth changes continuously from the perceived depth of the leading perceived depth adjusting frame to the perceived depth of the leading frame; and displaying the leading frame and the frames following thereafter, after the perceived depth adjusting frames are displayed.

In this case, the perceived depth adjusting means may increase the number of perceived depth adjusting frames as the difference in perceived depth of the last frame and the leading frame is greater.

As a further alternative, the perceived depth adjusting process administered by the perceived depth adjusting means may be a process comprising the steps of:

displaying a two dimensional frame corresponding to the leading frame of a scene to be processed following the last frame of a preceding scene;

displaying a number of perceived depth adjusting frames, in which the perceived depth changes continuously from that of the two dimensional frame to a reference frame in the scene to be processed, the number of perceived depth adjusting frames corresponding to the number of frames between the leading frame and the reference frame; and displaying the reference frame and the frames following thereafter, after the perceived depth adjusting frames are displayed.

In this case, the perceived depth adjusting means may increase the number of frames between the leading frame and the reference frame as the perceived depth of the leading frame is greater.

In addition, the perceived depth adjusting means may administer the perceived depth adjusting process according to comparison results between the number of frames in the scene to be processed, and the number of frames between the leading frame and the reference frame.

As a still further alternative, the perceived depth adjusting process administered by the perceived depth adjusting means may be a process comprising the steps of:

displaying a two dimensional frame corresponding to the leading frame of a scene to be processed, having a perceived depth corresponding to the perceived depth of the last frame of a preceding scene, following the last frame of a preceding scene;

displaying a perceived depth adjusting frame corresponding to the leading frame of the scene to be processed;

displaying a number of perceived depth adjusting frames, in which the perceived depth changes continuously from that of the leading perceived depth adjusting frame to a reference frame in the scene to be processed, the number of perceived depth adjusting frames corresponding to the number of frames between the leading frame and the reference frame; and displaying the reference frame and the frames following thereafter, after the perceived depth adjusting frames are displayed.

In this case, the perceived depth adjusting means may increase the number of frames between the leading frame and the reference frame as the difference in the perceived depth of the last frame and the leading frame is greater.

In addition, the perceived depth adjusting means may administer the perceived depth adjusting process according to comparison results between the number of frames in the scene to be processed, and the number of frames between the leading frame and the reference frame.

A stereoscopic video processing method according to the present invention is characterized by comprising the steps of:

receiving input of stereoscopic videos constituted by a plurality of frames, which are viewable stereoscopically;

detecting positions within the stereoscopic videos at which scene changes occur; and administering perceived depth adjusting processes that adjust the perceived depths of the stereoscopic videos such that the perceived depth changes gradually at the positions at which scene changes occur.

The stereoscopic video processing method according to the present invention may be provided as a program that causes a computer to execute the method.

Note that the program according to the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

According to the present invention, input of a stereoscopic video, which is constituted by a plurality of frames and viewable three dimensionally, is received, positions within the stereoscopic videos at which scene changes occur are detected, and the perceived depth of the stereoscopic video is adjusted such that the perceived depth changes gradually at the positions at which scene changes occur. Therefore, sudden changes in perceived depth at scene changes within the stereoscopic video are eliminated, and as a result, fatigue of viewers who view the stereoscopic videos three dimensionally can be reduced.

BRIEF DESCRIPTION OF THE DRAWINGS

FIG. 1 is a block diagram that illustrates the schematic construction of a stereoscopic video processing apparatus according to a first embodiment of the present invention.

FIG. 2 is a graph that illustrates the perceived depth of each scene of a stereoscopic video, which is input to the stereoscopic video processing apparatus of the first embodiment.

FIG. 5 is a flow chart that illustrates the steps of the process performed by the stereoscopic video processing apparatus of the first embodiment.

FIG. 6 is a flow chart that illustrates the steps of the perceived depth adjusting process administered by the stereoscopic video processing apparatus of the first embodiment.

FIG. 9 is a flow chart that illustrates the steps of the perceived depth adjusting process administered by the stereoscopic video processing apparatus of the second embodiment.

FIG. 10 is a flow chart that illustrates steps of the perceived depth adjusting process administered by a stereoscopic video processing apparatus according to a third embodiment of the present invention.

BEST MODE FOR CARRYING OUT THE INVENTION

Figure 3:
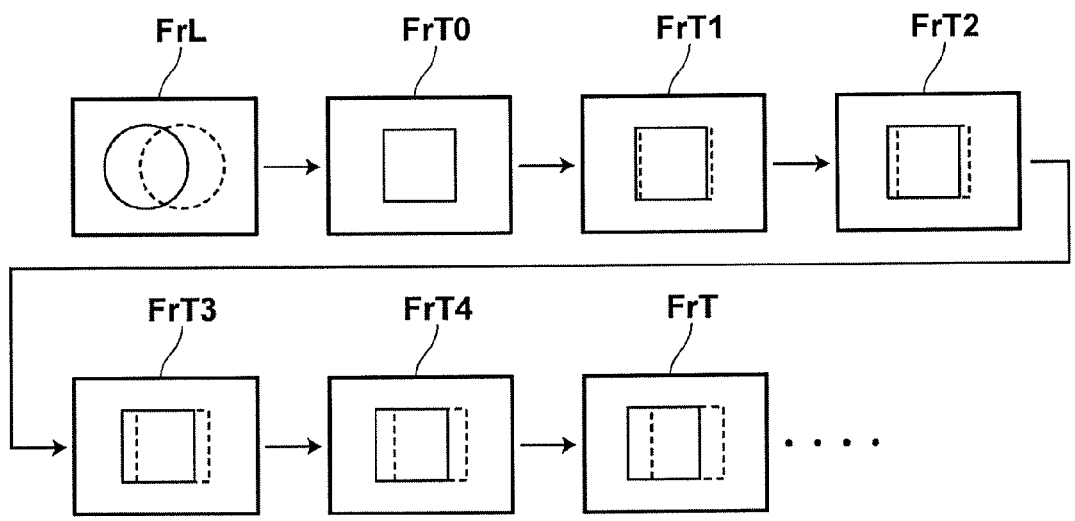
FIG. 3 is a diagram for explaining the perceived depth adjusting process administered by the stereoscopic video processing apparatus of the first embodiment.

Hereinafter, embodiments of the present invention will be described with reference to the attached drawings. FIG. 1 is a block diagram that illustrates the schematic construction of a stereoscopic video processing apparatus 1 according to a first embodiment of the present invention. As illustrated in FIG. 1, the stereoscopic image processing apparatus 1 is equipped with: an video input section 2; a scene detecting section 3; a perceived depth adjusting section 4; an input section 5 constituted by a keyboard, a mouse, and the like, for performing various input operations; a display section 6 such as a liquid crystal display monitor, for performing various types of display; and a control section 7. The components are connected by a bus 8.

The video input section 2 inputs video files of stereoscopic videos M0, which are to be processed by the stereoscopic video processing apparatus 1. Known means, such as a media drive that reads out image files from media, wired or wireless interfaces that receive input of video files via networks, and the like may be employed as the video input section 2. In the present embodiment, the video input section 2 is configured to read out video files from a medium 2A. Note that the video files are compressed into compressed formats such as MPEG. Therefore, the video input section 2 decompresses the input video files, and provides them to the stereoscopic video processing apparatus 1 for further processing.

The scene detecting section 3 detects positions within the stereoscopic videos M0, represented by video data included in the video files input by the video input section 2, at which scene changes occur. Specifically, the scene detecting section 3 calculates differences among pairs of sequential frames included in the stereoscopic videos M0, and detects positions at which frames differ greatly compared against differences among frames prior to and following the frames as the positions at which scene changes occur. Alternatively, the stereoscopic video M0 may be displayed by the display section 6, and the positions at which scene changes occur may be specified by viewer input. There are cases in which chapter marks that indicate scene changes are included in the stereoscopic videos M0. In these cases, the positions of the chapter marks may be detected as the positions at which scene changes occur. Note that there are cases in which the chapter marks are attached to the video files that represent the stereoscopic videos M0, and cases in which the chapter marks are input as files separate from the video files that represent the stereoscopic videos M0.

The perceived depth adjusting section 4 administers perceived depth adjusting processes on scenes to be processed such that the perceived depth thereof changes gradually as the scene begins to be displayed. FIG. 2 is a graph that illustrates the perceived depth of each scene of a stereoscopic video M0 which is input to the stereoscopic video processing apparatus 1 of the first embodiment. Note that in the present example, the stereoscopic video M0 includes three scenes S1, S2, and S3, each having a different perceived depth. In addition, no processes are administered at the start of the first scene S1, and perceived depth adjusting processes are administered at positions at which scene S1 changes to scene S2, and scene S2 changes to scene S3.

Here, the stereoscopic video M0 is generated from two videos which are obtained by imaging from two positions which are different in the horizontal direction. Stereoscopic display is realized by utilizing the parallax with respect to subjects which are included in the two videos. Accordingly, the perceived depth of a scene depends on parallax, and becomes greater as the difference between the maximum parallax and the minimum parallax within a scene is greater. In the first embodiment, the differences between the maximum parallax and the minimum parallax among pixels within frames of scenes are designated as the perceived depth. Alternatively, the stereoscopic video M0 may be displayed by the display section 6, and the perceived depths may be specified by viewer input. There are cases in which a stereoscopic video M0 has perceived depth data that indicates focal positions, zoom positions, baseline lengths between the cameras, convergence angles, and the like, which are necessary to obtain perceived depths, attached thereto. There are also cases in which such perceived depth data are input to the stereoscopic video processing apparatus 1 as a separate file. In these cases, the attached or input perceived depth data may be obtained, and the perceived depth may be derived from the perceived depth data.

Note that there are cases in which the perceived depth of a subject changes over time within a single scene. However, the present embodiment will be described assuming that the perceived depth is constant within each scene.

In the first embodiment, the perceived depth adjusting section 4 first generates a two dimensional frame FrT0 having no perceived depth, corresponding to a leading frame FrT of a scene to be processed. Here, each pixel corresponding to the subject included in the leading frame FrT has parallax. Therefore, the perceived depth adjusting section 4 processes the leading frame FrT by a morphing process or the like, to generate the two dimensional frame FrT0 having no perceived depth. Then, the perceived depth adjusting section 4 generates a number of perceived depth adjusting frames FrTi (i is the number of frames), in which the perceived depth changes continuously from that of the two dimensional frame FrT0 to that of the leading frame FrT. Note that the perceived depth adjusting frame FrTi is the same image as the leading frame FrT. Thereafter, the two dimensional frame FrT0 and the perceived depth adjusting frames FrTi are inserted between the scene to be processed and the preceding scene, to administer the perceived depth adjusting process onto the stereoscopic video M0.

FIG. 3 is a diagram for explaining the perceived depth adjusting process administered by the stereoscopic video processing apparatus 1 of the first embodiment. Note that in the descriptions of the first and subsequent embodiments, the subject included in the last frame FrL of the scene preceding the scene to be processed is a circle, and the subject included in the leading frame FrT of the scene to be processed is a square. In addition, in the descriptions of the first and subsequent embodiments, the parallax with respect to subjects within each frame is indicated by the amount of shift between the two subjects, which are drawn with a solid line and a dotted line. Note that in the descriptions of the first and subsequent embodiments, the two subjects are drawn with the solid line and the dotted line for the sake of convenience in expressing parallax. However, in actual frames, a single subject having perceived depth is visually recognized by three dimensional viewing.

The perceived depth adjusting section 4 inserts the frame FrT0 and the perceived depth adjusting frames FrT1 through FrT4 between the scene to be processed and the preceding scene, to complete the perceived depth adjusting process and to generate a processed stereoscopic video M1. In the processed stereoscopic video M1, the two dimensional frame FrT0 corresponding to the leading frame FrT of the scene to be processed is displayed following display of the last frame FrL of the preceding scene. Then, a number (four in this case) of perceived depth adjusting frames FrT1 through FrT4 are displayed following display of the two dimensional frame FrT0. Thereafter, the leading frame FrT and the frames following the leading frame FrT are displayed.

Figure 4:
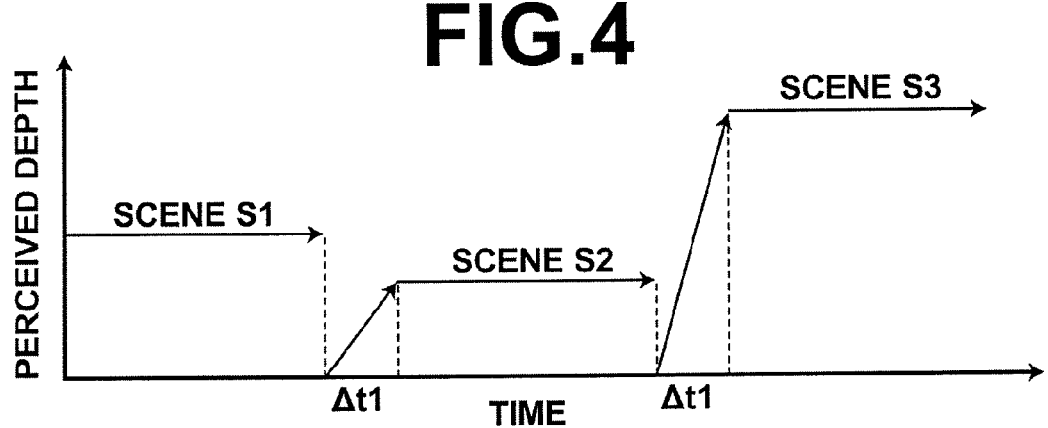
FIG. 4 is a graph that illustrates the perceived depths of a processed stereoscopic video generated by the stereoscopic video processing apparatus of the first embodiment.

FIG. 4 is a graph that illustrates the perceived depths of the processed stereoscopic video M1. As illustrated in FIG. 4, the perceived depths change gradually at the start position of each scene, from a perceived depth value of 0 to the perceived depth of the leading frame FrT, by two dimensional frames FrT0 and perceived adjusting frames FrTi being inserted among scenes S1 through S3 of the processed stereoscopic video M1. When the perceived depth becomes that of the leading frame FrT, reproduction of the scene is initiated. Note that in the first embodiment, the number of frames which are inserted among the scenes is constant. Therefore, the two dimensional frames FrT0 and the perceived depth adjusting frames FrTi are displayed for an amount of time Δt1 corresponding to the number of frames which are inserted among the scenes. There is no change in the playback times of each scene, and therefore the playback time of the processed stereoscopic video M1 becomes longer than that of the stereoscopic video M0 for the amount of time corresponding to the number of frames which are inserted.

The control section 7 is equipped with: a CPU 7A; a RAM 7B, which functions as a workspace during execution of processes; and a ROM 7C, in which programs for operating the stereoscopic video processing apparatus 1, various constants, and the like are recorded. The control section 7 functions to control the operations of the components of the stereoscopic video processing apparatus 1.

Next, the process performed by the stereoscopic video processing apparatus 1 of the first embodiment will be described. FIG. 5 is a flow chart that illustrates the steps of the process performed by the stereoscopic video processing apparatus 1 of the first embodiment. The control section 7 initiates processes by a command to administer processes onto a stereoscopic video M0 being input via the input section 5, and the video input section 2 reads out the stereoscopic video M0 from the medium 2A (step ST1). The scene detecting section 3 detects positions within the stereoscopic video M0 at which scene changes occur (step ST2). Then, the perceived depth adjusting section 4 administers the perceived depth adjusting process onto the stereoscopic video M0, to generate a processed stereoscopic video M1 (step ST3).

FIG. 6 is a flow chart that illustrates the steps of the perceived depth adjusting process administered by the stereoscopic video processing apparatus 1 of the first embodiment. The perceived depth adjusting section 4 sets a first scene to be processed (step ST11), and generates a two dimensional frame FrT0 that corresponds to the leading frame FrT of the scene to be processed (step ST12). Note that the "first scene to be processed" refers to the scene that follows the first scene of the stereoscopic video M0, that is, scene S2 illustrated in FIG. 2.

Next, the perceived depth adjusting section 4 generates a number of perceived depth adjusting frames FrTi, in which the perceived depth changes continuously from that of the two dimensional frame FrT0 to that of the leading frame FrT (step ST13). Then, the perceived depth adjusting section 4 inserts the frame FrT0 and the perceived depth adjusting frames FrTi between the scene to be processed and the preceding scene (step ST14, INSERT FRAMES).

Thereafter, the perceived depth adjusting section 4 judges whether processing of all scenes has been completed (step ST15). In the case that the result of judgment in step ST15 is negative, the scene to be processed is changed (step ST16), and the process returns to step ST12. In the case that the result of judgment in step ST15 is affirmative, the perceived depth adjusting process ends.

Referring again to FIG. 5, the control section 7 records the processed stereoscopic video M1 in the medium 2A (step ST4), and the process ends.

In the stereoscopic video processing apparatus 1 according to the first embodiment, the perceived depth of the stereoscopic video M0 is adjusted such that the perceived depth changes gradually at the positions at which scene changes occur, as described above. Therefore, sudden changes in perceived depth at scene changes within the stereoscopic video are eliminated, and as a result, fatigue of viewers who view the stereoscopic videos three dimensionally can be reduced.

Next, a stereoscopic video processing apparatus according to a second embodiment of the present invention will be described. Note that the stereoscopic video processing apparatus of the second embodiment has the same construction as the stereoscopic video processing apparatus 1 of the first embodiment, and only the process performed by the perceived depth adjusting section 4 differ. Therefore, detailed descriptions of the components of the stereoscopic video processing apparatus will be omitted here. Note also that the stereoscopic video M0 having the same scenes S1 through S3 as in the first embodiment will be the target of processing in the second embodiment.

In the stereoscopic video processing apparatus of the second embodiment, the perceived depth adjusting section 4 generates a leading perceived depth adjusting frame FrTc0 corresponding to the leading frame FrT of a scene to be processed and having a perceived depth corresponding to the perceived depth of the last frame FrL of the scene preceding the scene to be processed. Here, the last frame FrL and the leading frame FrT have different perceived depths. Therefore, the perceived depth adjusting section 4 processes the leading frame FrT by a morphing process or the like, to generate the leading perceived depth adjusting frame FrTc0 having the same perceived depth as the last frame FrL. Then, a number of perceived depth adjusting frames FrTci (i is the number of frames), in which the perceived depth changes continuously from the perceived depth of the leading perceived depth adjusting frame FrTc0 to the perceived depth of the leading frame FrT, are generated. Note that the perceived depth adjusting frame FrTci is the same image as the leading frame FrT. Thereafter, the leading perceived depth adjusting frame FrTc0 and the perceived depth adjusting frames FrTci are inserted between the scenes, to administer the perceived depth adjusting process onto the stereoscopic video M0.

Figure 7:
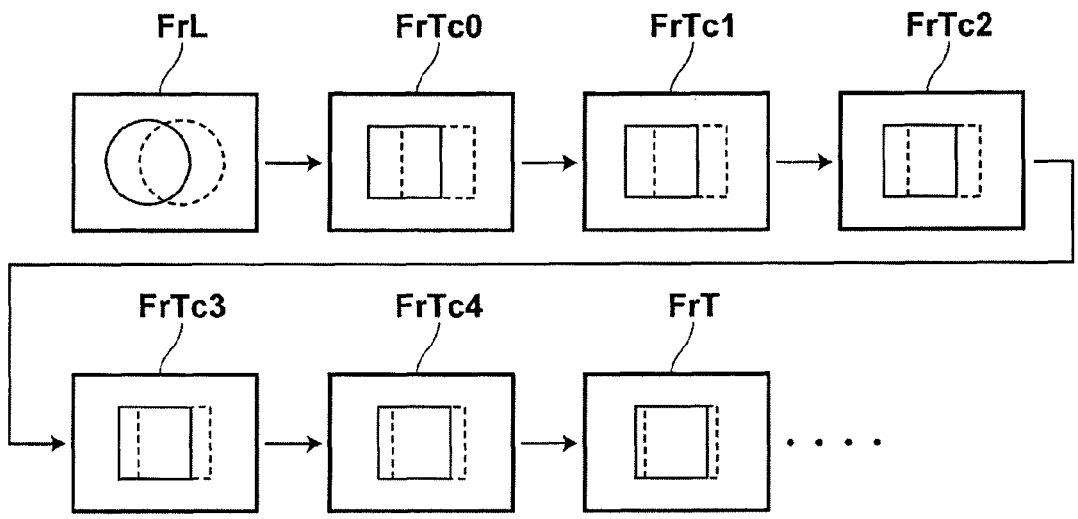
FIG. 7 is a diagram for explaining the perceived depth adjusting process administered by a stereoscopic video processing apparatus according to a second embodiment of the present invention.

FIG. 7 is a diagram for explaining the perceived depth adjusting process administered by the stereoscopic video processing apparatus of the second embodiment. The perceived depth adjusting section 4 inserts the frame FrTc0 and the perceived depth adjusting frames FrTc1 through FrTc4 between scenes, to complete the perceived depth adjusting process and to generate a processed stereoscopic video M1. In the processed stereoscopic video M1, the leading perceived depth adjusting frame FrTc0 corresponding to the leading frame FrT of the scene to be processed is displayed following display of the last frame FrL of the preceding scene. Then, a number (four in this case) of perceived depth adjusting frames FrTc1 through FrTc4 are displayed following display of the leading perceived depth adjusting frame FrTc0. Thereafter, the leading frame FrT and the frames following the leading frame FrT are displayed.

Figure 8:
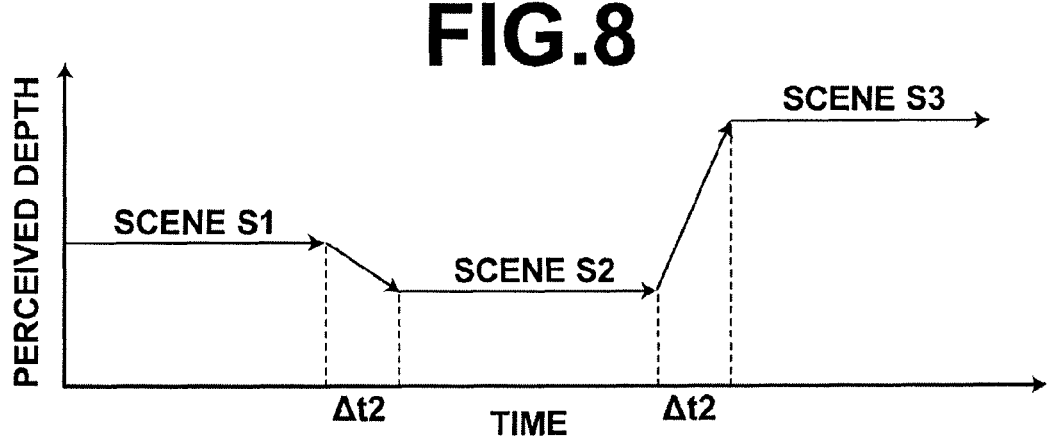
FIG. 8 is a graph that illustrates the perceived depths of a processed stereoscopic video generated by the stereoscopic video processing apparatus of the second embodiment.

FIG. 8 is a graph that illustrates the perceived depths of the processed stereoscopic video M1 generated by the stereoscopic video processing apparatus of the second embodiment. As illustrated in FIG. 8, the perceived depths change gradually at the start position of each scene, from perceived depths of a preceding scene to the perceived depth of the leading frame FrT of each scene, by leading perceived depth adjusting frames FrTc0 and perceived adjusting frames FrTci being inserted among scenes S1 through S3 of the processed stereoscopic video M1. When the perceived depth becomes that of the leading frame FrT, reproduction of the scene is initiated. Note that in the second embodiment, the number of frames which are inserted among the scenes is constant. Therefore, the leading perceived depth adjusting frames FrTc0 and the perceived depth adjusting frames FrTci are displayed for an amount of time Δt2 corresponding to the number of frames which are inserted among the scenes. There is no change in the playback times of each scene, and therefore the playback time of the processed stereoscopic video M1 becomes longer than that of the stereoscopic video M0 for the amount of time corresponding to the number of frames which are inserted.

Next, the process performed by the stereoscopic video processing apparatus of the second embodiment will be described. FIG. 9 is a flow chart that illustrates the steps of the perceived depth adjusting process administered by the stereoscopic video processing apparatus of the second embodiment. The perceived depth adjusting section 4 sets a first scene to be processed (step ST21), and generates a leading perceived depth adjusting frame FrTc0 that corresponds to the leading frame FrT of the scene to be processed (step ST22).

Next, the perceived depth adjusting section 4 generates a number of perceived depth adjusting frames FrTci, in which the perceived depth changes continuously from that of the leading perceived depth adjusting frame FrTc0 to that of the leading frame FrT (step ST23). Then, the perceived depth adjusting section 4 inserts the leading perceived depth adjusting frame FrTc0 and the perceived depth adjusting frames FrTci between the scene to be processed and the preceding scene (step ST24, INSERT FRAMES).

Thereafter, the perceived depth adjusting section 4 judges whether processing of all scenes has been completed (step ST25). In the case that the result of judgment in step ST25 is negative, the scene to be processed is changed (step ST26), and the process returns to step ST22. In the case that the result of judgment in step ST25 is affirmative, the perceived depth adjusting process ends.

Note that in the first embodiment described above, the two dimensional frame FrT0 and the predetermined number of perceived depth adjusting frames FrTi are inserted between the scenes. Therefore, the amount of time during which the perceived depth changes between scenes is a constant amount of time Δt1.

However, if the number of frames which are inserted between scenes is constant, the perceived depth will change drastically in cases that the perceived depth of a scene is great. For this reason, the number of perceived depth adjusting frames FrTi may be increased as the perceived depth becomes greater. A stereoscopic video processing apparatus having such a configuration will be described as a third embodiment of the present invention.

FIG. 10 is a flow chart that illustrates steps of the perceived depth adjusting process administered by a stereoscopic video processing apparatus according to the third embodiment. The perceived depth adjusting section 4 sets a first scene to be processed (step ST31), and generates a two dimensional frame FrT0 that corresponds to the leading frame FrT of the scene to be processed (step ST32).

Next, the perceived depth adjusting section 4 sets the number of perceived depth adjusting frames FrTi, according to the perceived depth of the scene to be processed (step ST33, SET NUMBER OF FRAMES). Specifically, the number of perceived depth adjusting frames FrTi is set to be proportional to the perceived depth. Next, the perceived depth adjusting section 4 generates the perceived depth adjusting frames FrTi, in which the perceived depth changes continuously from that of the two dimensional frame FrT0 to that of the leading frame FrT (step ST34). Then, the perceived depth adjusting section 4 inserts the frame FrT0 and the perceived depth adjusting frames FrTi between the scene to be processed and the preceding scene (step ST35, INSERT FRAMES).

Thereafter, the perceived depth adjusting section 4 judges whether processing of all scenes has been completed (step ST36). In the case that the result of judgment in step ST36 is negative, the scene to be processed is changed (step ST37), and the process returns to step ST32. In the case that the result of judgment in step ST36 is affirmative, the perceived depth adjusting process ends.

Figure 11:
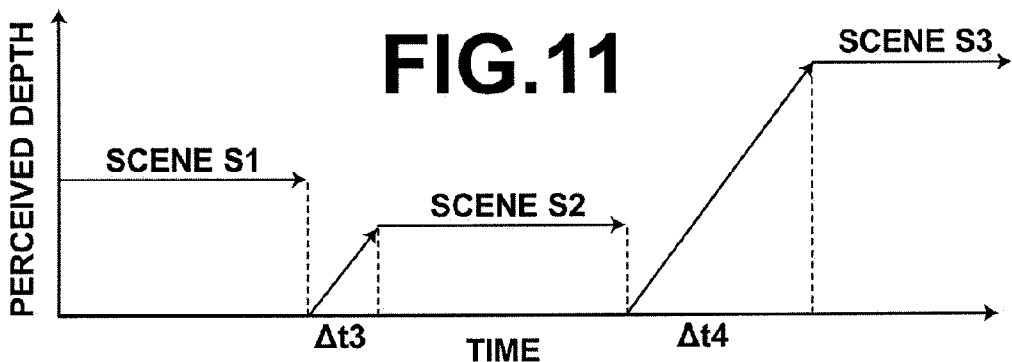
FIG. 11 is a graph that illustrates the perceived depths of a processed stereoscopic video generated by the stereoscopic video processing apparatus of the third embodiment.

FIG. 11 is a graph that illustrates the perceived depths of a processed stereoscopic video M1 which is generated by the stereoscopic video processing apparatus of the third embodiment. As illustrated in FIG. 11, the perceived depths change gradually at the start position of each scene, from a perceived depth value of 0 to the perceived depth of the leading frame FrT, by two dimensional frames FrT0 and numbers of perceived adjusting frames FrTi corresponding to the perceived depths of the scenes being inserted among scenes S1 through S3 of the processed stereoscopic video M1. When the perceived depth becomes that of the leading frame FrT at the initiation position of each scene, reproduction of the scene is initiated. The number of perceived depth adjusting frames FrTi which are inserted increases as the perceived depth of a scene is greater. Therefore, the two dimensional frames FrT0 and the perceived depth adjusting frames FrTi are displayed for amounts of time $\Delta t3$ and $\Delta t4$ corresponding to the numbers of frames which are inserted among the scenes. Note that $\Delta t4 > \Delta t3$, because scene S3 has a greater perceived depth than scene S2. There is no change in the playback times of each scene, and therefore the playback time of the processed stereoscopic video M1 becomes longer than that of the stereoscopic video M0 for the amount of time corresponding to the number of frames which are inserted.

Drastic changes in perceived depths at scene changes are prevented, by increasing the number of perceived depth adjusting frames to be inserted as the perceived depth of scenes become greater. Therefore, fatigue of viewers who view the processed stereoscopic video M1 three dimensionally can be reduced further.

Note that in the second embodiment described above as well, the number of perceived depth adjusting frames FrTci which are inserted between the scenes can be increased as the difference in the perceived depth of the last frame FrL of a scene preceding a scene to be processed and the perceived depth of a scene to be processed becomes greater, as in the third embodiment. A stereoscopic video processing apparatus having such a configuration will be described as a fourth embodiment of the present invention.

Figure 12:
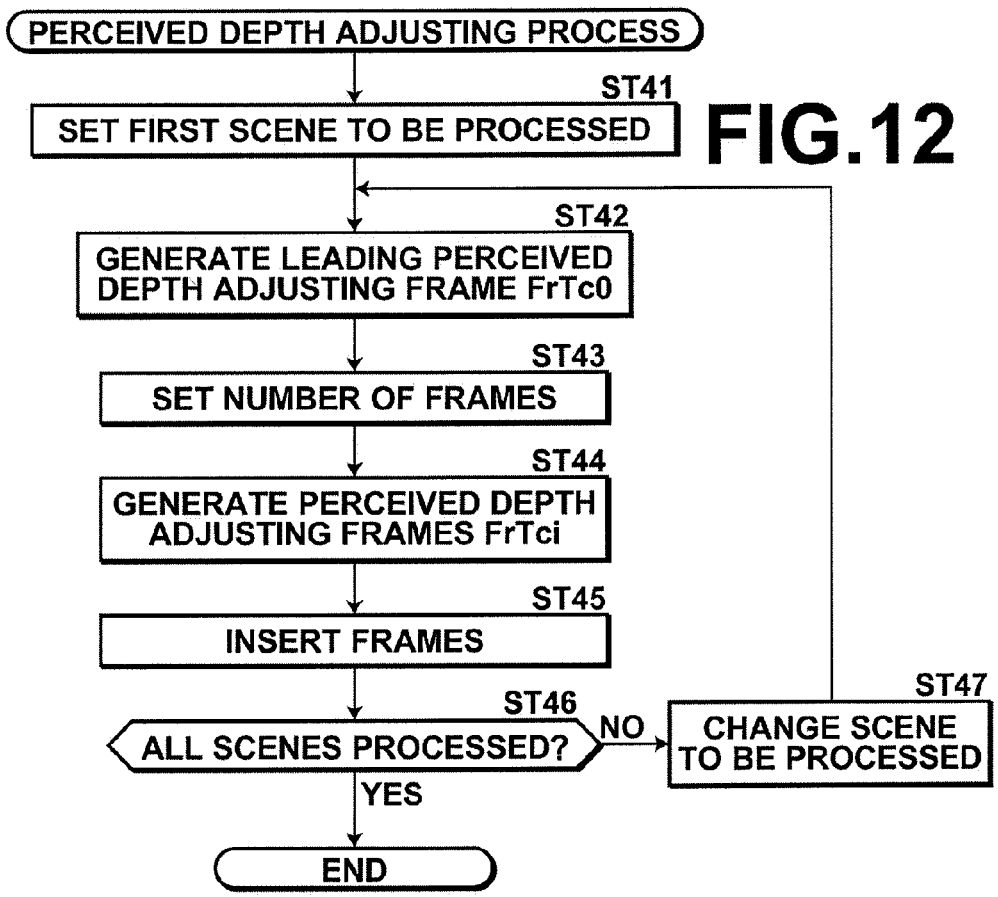
FIG. 12 is a flow chart that illustrates steps of the perceived depth adjusting process administered by a stereoscopic video processing apparatus according to a fourth embodiment of the present invention.

FIG. 12 is a flow chart that illustrates steps of the perceived depth adjusting process administered by a stereoscopic video processing apparatus according to the fourth embodiment. The perceived depth adjusting section 4 sets a first scene to be processed (step ST41), and generates a leading perceived depth adjusting frame FrTc0 that corresponds to the leading frame FrT of the scene to be processed (step ST42).

Next, the perceived depth adjusting section 4 sets the number of perceived depth adjusting frames FrTci, according to the difference in perceived depths between the last frame FrL of the scene preceding the scene to be processed and the leading frame FrT (step ST43, SET NUMBER OF FRAMES). Specifically, the number of perceived depth adjusting frames FrTci is set to be proportional to the difference in perceived depth. Next, the perceived depth adjusting section 4 generates the perceived depth adjusting frames FrTci, in which the perceived depth changes continuously from that of the leading perceived depth adjusting frame FrTc0 to that of the leading frame FrT (step ST44). Then, the perceived depth adjusting section 4 inserts the frame FrTc0 and the perceived depth adjusting frames FrTci between the scene to be processed and the preceding scene (step ST45, INSERT FRAMES).

Thereafter, the perceived depth adjusting section 4 judges whether processing of all scenes has been completed (step ST46). In the case that the result of judgment in step ST46 is negative, the scene to be processed is changed (step ST47), and the process returns to step ST42. In the case that the result of judgment in step ST46 is affirmative, the perceived depth adjusting process ends.

Figure 13:
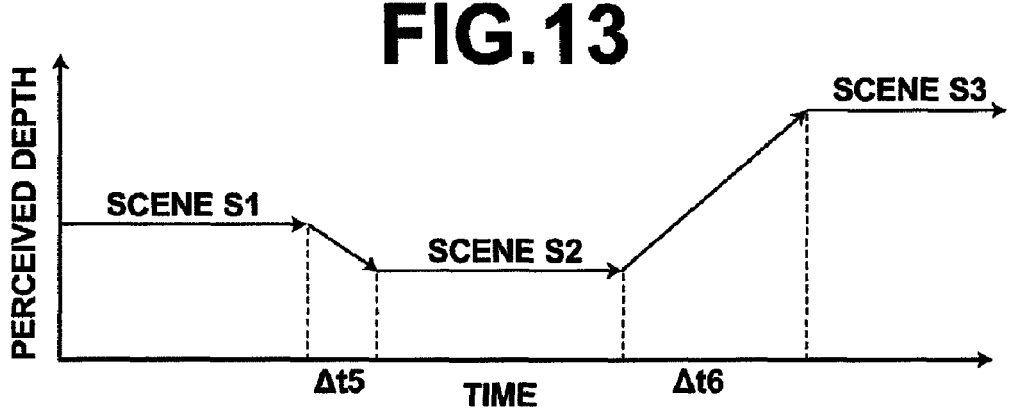
FIG. 13 is a graph that illustrates the perceived depths of a processed stereoscopic video generated by the stereoscopic video processing apparatus of the fourth embodiment.

FIG. 13 is a graph that illustrates the perceived depths of a processed stereoscopic video M1 which is generated by the stereoscopic video processing apparatus of the fourth embodiment. As illustrated in FIG. 13, the perceived depths change gradually at the start position of each scene, from the perceived depth of the last frame FrL of the preceding scene to the perceived depth of the leading frame FrT, by leading perceived depth adjusting frames FrTc0 and numbers of perceived adjusting frames FrTci corresponding to the differences in perceived depths of the between the preceding scenes being inserted among scenes S1 through S3 of the processed stereoscopic video M1. When the perceived depth becomes that of the leading frame FrT at the initiation position of each scene, reproduction of the scene is initiated. The number of perceived depth adjusting frames FrTi which are inserted increases as the difference in perceived depth between scenes is greater. Therefore, the leading perceived depth adjusting frames FrTc0 and the perceived depth adjusting frames FrTci are displayed for amounts of time $\Delta t5$ and $\Delta t6$ corresponding to the numbers of frames which are inserted among the scenes. Note that $\Delta t6 > \Delta t5$, because the difference in perceived depth between scene S2 and scene S3 is greater than the difference in perceived depth between scene S1 and scene S2. There is no change in the playback times of each scene, and therefore the playback time of the processed stereoscopic video M1 becomes longer than that of the stereoscopic video M0 for the amount of time corresponding to the number of frames which are inserted.

Next, a stereoscopic video processing apparatus according to a fifth embodiment of the present invention will be described. Note that the stereoscopic video processing apparatus of the fifth embodiment has the same construction as the stereoscopic video processing apparatus 1 of the first embodiment, and only the process performed by the perceived depth adjusting section 4 differ. Therefore, detailed descriptions of the components of the stereoscopic video processing apparatus will be omitted here.

In the stereoscopic video processing apparatus of the fifth embodiment, the perceived depth adjusting section 4 administers a perceived depth adjusting process to a stereoscopic video M0 such that the perceived depth changes continuously from a value of 0, at a leading frame FrT of a scene to be processed, to a perceived depth of a reference frame FrB, at the reference frame FrB.

Figure 14:
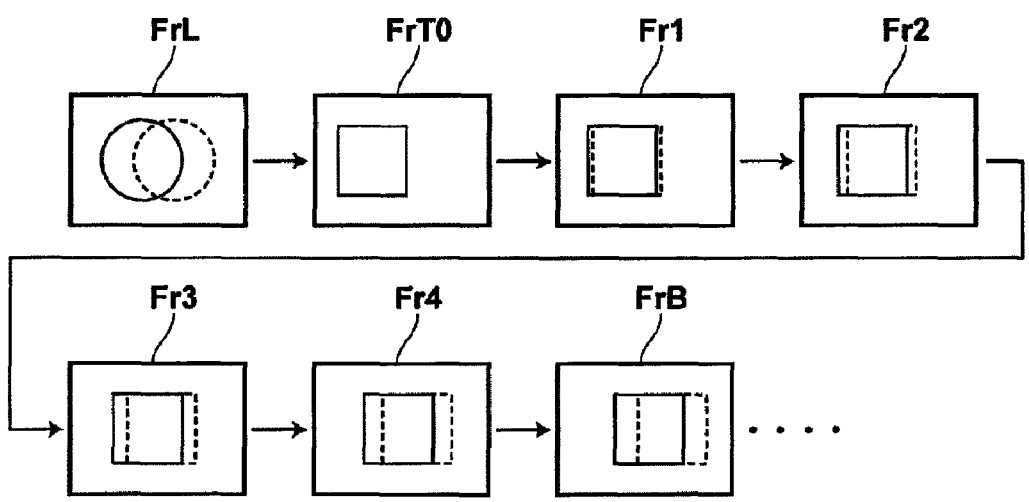
FIG. 14 is a diagram for explaining the perceived depth adjusting process administered by a stereoscopic video processing apparatus according to a fifth embodiment of the present invention.

FIG. 14 is a diagram for explaining the perceived depth adjusting process administered by the stereoscopic video processing apparatus of the fifth embodiment. Note that in the descriptions of the fifth and subsequent embodiments, the subject included in the last frame FrL of the scene preceding the scene to be processed is a circle, and the subject included in the leading frame FrT of the scene to be processed is a square. The square subject moves from the left of the screen to the right of the screen in the scene to be processed. The perceived depth adjusting section 4 replaces the frames of a scene from the leading frame FrT to a frame immediately preceding the reference frame FrB, with a two dimensional frame FrT0 and perceived depth adjusting frames FrT1 through FrT4, to complete the perceived depth adjusting process and to generate a processed stereoscopic video M1. In the processed stereoscopic video M1, the two dimensional frame FrT0 corresponding to the leading frame FrT of the scene to be processed is displayed following display of the last frame FrL of the preceding scene. Then, a number of perceived depth adjusting frames corresponding to the number of frames between the leading frame FrT and the reference frame FrB (four in this case, therefore, FrT1 through FrT4) and in which the perceived depth changes continuously up to the perceived depth of the reference frame FrB (the sixth frame) are displayed following display of the two dimensional frame FrT0. Thereafter, the reference frame FrB and the frames following the reference frame FrB are displayed.

Figure 15:
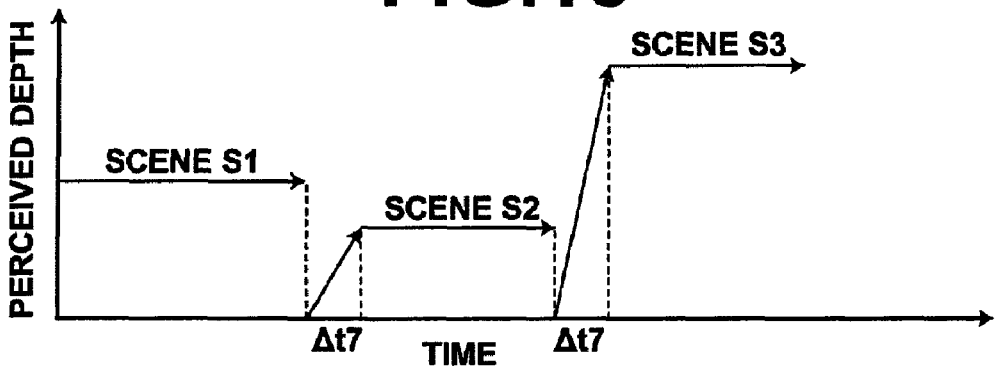
FIG. 15 is a graph that illustrates the perceived depths of the processed stereoscopic video generated by the stereoscopic video processing apparatus of the fifth embodiment.

FIG. 15 is a graph that illustrates the perceived depths of the processed stereoscopic video M1 generated by the stereoscopic video processing apparatus of the fifth embodiment. As illustrated in FIG. 15, the perceived depths change gradually at the start position of each scene, from a perceived depth value of 0 to the perceived depth of the reference frame FrB, by frames of a scene from the leading frame FrT to a frame immediately preceding the reference frame FrB being replaced with two dimensional frame FrT0 and perceived depth adjusting frames FrT1 through FrT4 in scenes S1 through S3 of the processed stereoscopic video M1. Note that in the fifth embodiment, the number of frames from the leading frames FrT to the reference frames FrB is constant. Therefore, the two dimensional frames FrT0 and the perceived depth adjusting frames FrTi are displayed for an amount of time Δt7 corresponding to the number of frames. No additional frames are inserted into each scene, and therefore the playback time of the processed stereoscopic video M1 is the same as that of the stereoscopic video M0.

Figure 16:
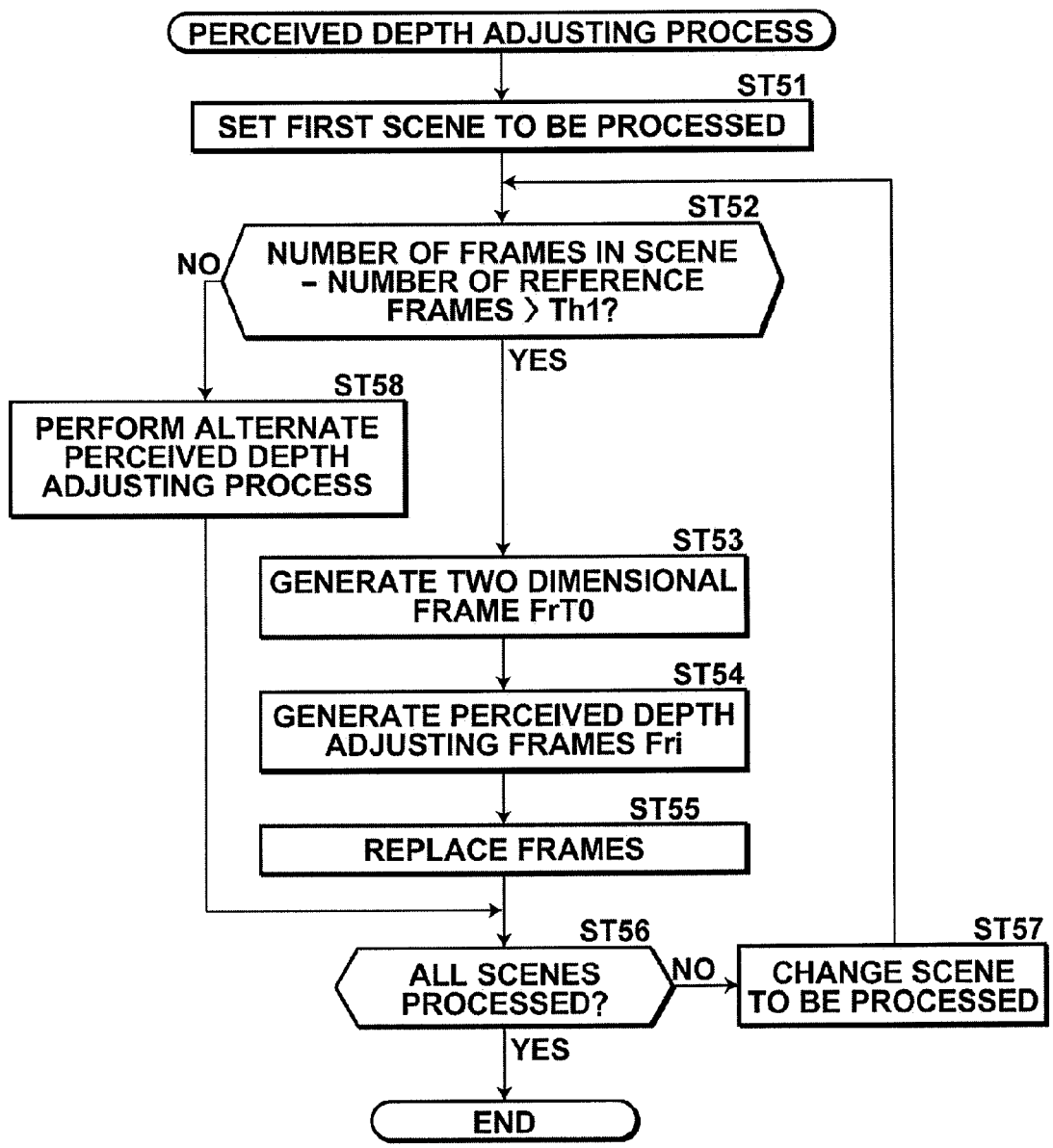
FIG. 16 is a flow chart that illustrates the steps of the perceived depth adjusting process administered by the stereoscopic video processing apparatus of the fifth embodiment.

Next, the process performed by the stereoscopic video processing apparatus of the fifth embodiment will be described. FIG. 16 is a flow chart that illustrates the steps of the perceived depth adjusting process administered by the stereoscopic video processing apparatus of the fifth embodiment. The perceived depth adjusting section 4 sets a first scene to be processed (step ST51), and judges whether the difference in the number of frames of a scene to be processed and the number of frames from a leading frame FrT to a reference frame FrB (number of reference frames) is greater than or equal to a threshold value Th1 (step ST52). Note that step ST52 is performed to prevent the length of the perceived depth adjustment from becoming excessively long with respect to the length of the scene to be processed. Alternatively, the percentage of the number of reference frames with respect to the number of frames of the scene to be processed may be employed instead of the difference between the two. In the case that the result of judgment in step ST52 is affirmative, the perceived depth adjusting section 4 generates a two dimensional frame FrT0 that corresponds to the leading frame FrT of the scene to be processed (step ST53).

Next, the perceived depth adjusting section 4 generates a number of perceived depth adjusting frames FrTi corresponding to the frames between the leading frame FrT and the reference frame FrB, in which the perceived depth changes continuously from that of the two dimensional frame FrT0 to that of the reference frame FrB (step ST54). Then, the perceived depth adjusting section 4 replaces the frames from the leading frame FrT of the scene to be processed to a frame immediately preceding the reference frame FrB with the two dimensional frame FrT0 and the perceived depth adjusting frames FrTi (step ST55, REPLACE FRAMES).

Thereafter, the perceived depth adjusting section 4 judges whether processing of all scenes has been completed (step ST56). In the case that the result of judgment in step ST56 is negative, the scene to be processed is changed (step ST57), and the process returns to step ST53. In the case that the result of judgment in step ST56 is affirmative, the perceived depth adjusting process ends.

Note that in the case that the result of judgment in step ST52 is negative, an alternate perceived depth adjusting process is administered (step ST58), and the process proceeds to step ST56. The alternative perceived depth adjusting process may be that described in any one of the first through fourth embodiments. Note that a perceived depth adjusting process may not be performed in the case that the result of judgment in step ST52 is negative.

In the stereoscopic video processing apparatus according to the fifth embodiment, the perceived depth of the stereoscopic video M0 is adjusted such that the perceived depth changes gradually at the positions at which scene changes occur, as described above. Therefore, sudden changes in perceived depth at scene changes within the stereoscopic video are eliminated, and as a result, fatigue of viewers who view the stereoscopic videos three dimensionally can be reduced. In addition, the playback time of the processed stereoscopic video M1 is the same as that of the stereoscopic video M0. Therefore, increase in file size of the video file due to the perceived depth adjusting process can be prevented.

Next, a stereoscopic video processing apparatus according to a sixth embodiment of the present invention will be described. Note that the stereoscopic video processing apparatus of the sixth embodiment has the same construction as the stereoscopic video processing apparatus 1 of the first embodiment, and only the process performed by the perceived depth adjusting section 4 differ. Therefore, detailed descriptions of the components of the stereoscopic video processing apparatus will be omitted here.

In the stereoscopic video processing apparatus of the sixth embodiment, the perceived depth adjusting section 4 generates a leading perceived depth adjusting frame FrTc0 corresponding to the leading frame FrT of a scene to be processed and having a perceived depth corresponding to the perceived depth of the last frame FrL of the scene preceding the scene to be processed, in the same manner as in the second embodiment. The perceived depth adjusting section 4 administers a perceived depth adjusting process to a stereoscopic video M0 such that the perceived depth of the leading perceived depth adjusting frame FrTc0 to a reference frame FrB changes continuously from that of the leading perceived depth adjusting frame FrTc0 to that of the reference frame.

Figure 17:
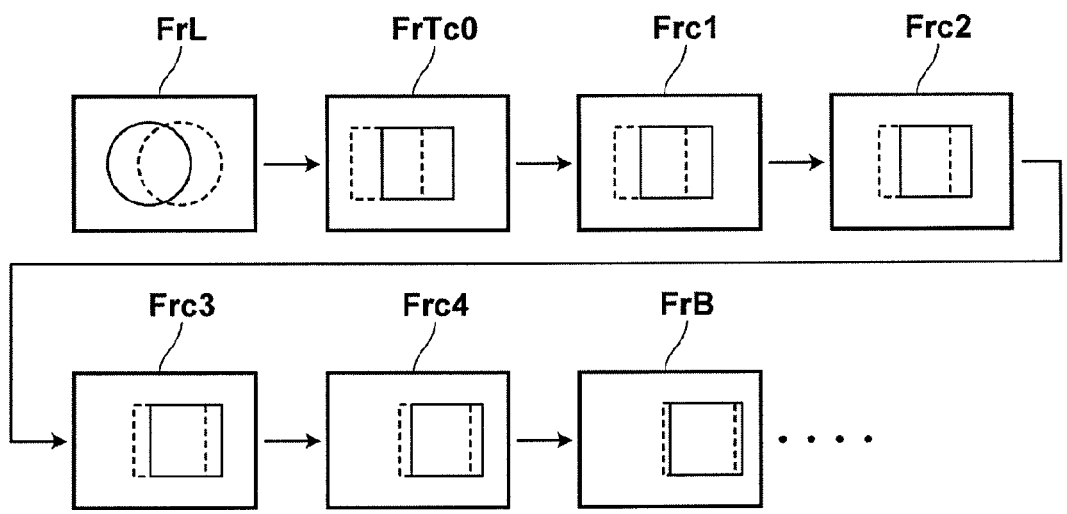
FIG. 17 is a diagram for explaining the perceived depth adjusting process administered by a stereoscopic video processing apparatus according to a sixth embodiment of the present invention.

FIG. 17 is a diagram for explaining the perceived depth adjusting process administered by the stereoscopic video processing apparatus of the sixth embodiment. The perceived depth adjusting section 4 replaces the frames of a scene from the leading frame FrT to a frame immediately preceding the reference frame FrB, with the leading perceived depth adjusting frame FrTc0 and perceived depth adjusting frames Frc1 through Frc4, to complete the perceived depth adjusting process and to generate a processed stereoscopic video M1. In the processed stereoscopic video M1, the leading perceived depth adjusting frame FrTc0 corresponding to the leading frame FrT of the scene to be processed is displayed following display of the last frame FrL of the preceding scene. Then, a number of perceived depth adjusting frames corresponding to the number of frames between the leading frame FrT and the reference frame FrB (four in this case, therefore, Frc1 through Frc4) and in which the perceived depth changes continuously from that of the leading perceived depth adjusting frame FrTc0 to that of the reference frame FrB (the sixth frame) are displayed following display of the leading perceived depth adjusting frame FrTc0. Thereafter, the reference frame FrB and the frames following the reference frame FrB are displayed.

Figure 18:
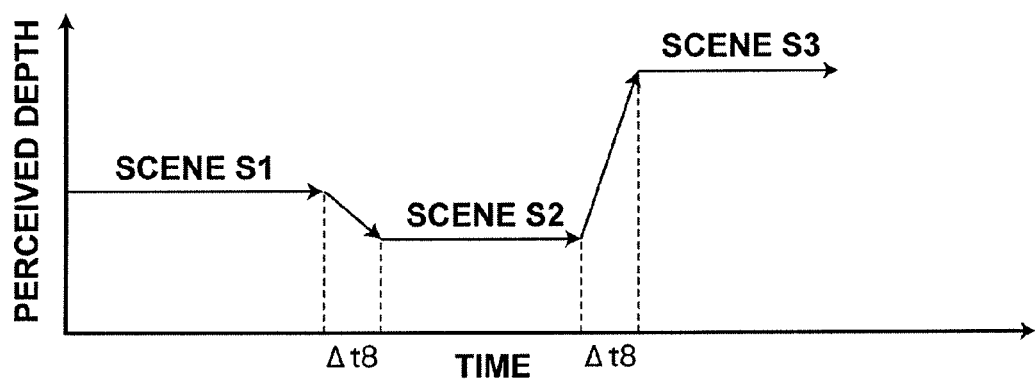
FIG. 18 is a graph that illustrates the perceived depths of the processed stereoscopic video generated by the stereoscopic video processing apparatus of the sixth embodiment.

FIG. 18 is a graph that illustrates the perceived depths of the processed stereoscopic video M1 generated by the stereoscopic video processing apparatus of the sixth embodiment. As illustrated in FIG. 18, the perceived depths change gradually at the start position of each scene, from a perceived depth value of a previous scene to the perceived depth of the reference frame FrB, by frames of a scene from the leading frame FrT to a frame immediately preceding the reference frame FrB being replaced with leading perceived depth adjusting frames FrTc0 and perceived depth adjusting frames Frc1 through Frc4 in scenes S1 through S3 of the processed stereoscopic video M1. Note that in the sixth embodiment, the number of frames between the leading scenes FrT and the reference frames FrB is constant. Therefore, the leading perceived depth adjusting frames FrTc0 and the perceived depth adjusting frames Frci are displayed for an amount of time Δt8 corresponding to the number of frames. No additional frames are inserted into each scene, and therefore the playback time of the processed stereoscopic video M1 is the same as that of the stereoscopic video M0.

Figure 19:
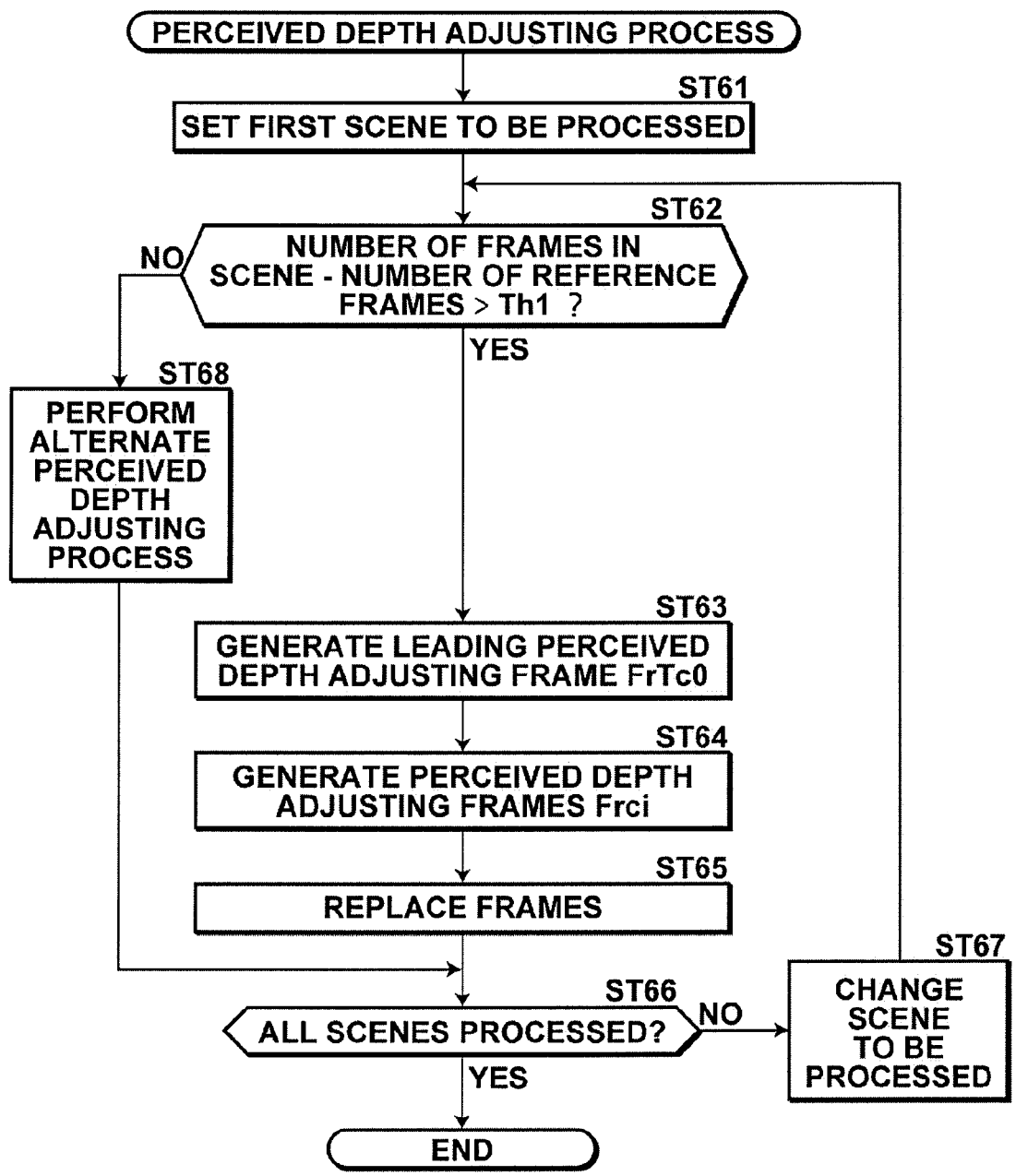
FIG. 19 is a flow chart that illustrates the steps of the perceived depth adjusting process administered by the stereoscopic video processing apparatus of the sixth embodiment.

Next, the process performed by the stereoscopic video processing apparatus of the sixth embodiment will be described. FIG. 19 is a flow chart that illustrates the steps of the perceived depth adjusting process administered by the stereoscopic video processing apparatus of the sixth embodiment. The perceived depth adjusting section 4 sets a first scene to be processed (step ST61), and judges whether the difference in the number of frames of a scene to be processed and the number of frames from a leading frame FrT to a reference frame FrB (number of reference frames) is greater than or equal to a threshold value Th1 (step ST62). Note that the percentage of the number of reference frames with respect to the number of frames of the scene to be processed may be employed instead of the difference between the two. In the case that the result of judgment in step ST62 is affirmative, the perceived depth adjusting section 4 generates a leading perceived depth adjusting frame FrTc0 that corresponds to the leading frame FrT of the scene to be processed (step ST63).

Next, the perceived depth adjusting section 4 generates a number of perceived depth adjusting frames Frci corresponding to the frames between the leading frame FrT and the reference frame FrB, in which the perceived depth changes continuously from that of the leading perceived depth adjusting frame FrTc0 to that of the reference frame FrB (step ST64). Then, the perceived depth adjusting section 4 replaces the frames from the leading frame FrT of the scene to be processed to a frame immediately preceding the reference frame FrB with the leading perceived depth adjusting frame FrTc0 and the perceived depth adjusting frames Frci (step ST65, REPLACE FRAMES).

Thereafter, the perceived depth adjusting section 4 judges whether processing of all scenes has been completed (step ST66). In the case that the result of judgment in step ST66 is negative, the scene to be processed is changed (step ST67), and the process returns to step ST63. In the case that the result of judgment in step ST66 is affirmative, the perceived depth adjusting process ends.

Note that in the case that the result of judgment in step ST62 is negative, an alternate perceived depth adjusting process is administered (step ST68), and the process proceeds to step ST66. The alternative perceived depth adjusting process may be that described in any one of the first through fourth embodiments. Note that a perceived depth adjusting process may not be performed in the case that the result of judgment in step ST62 is negative.

Note that in the fifth embodiment described above, the two dimensional frame FrT0 and the predetermined number of perceived depth adjusting frames FrTi replace the frames from the leading frame FrT to the reference frame FrB. Therefore, the amount of time during which the perceived depth changes between scenes is a constant amount of time Δt7.

However, if the number of frames which are inserted between scenes is constant, the perceived depth will change drastically in cases that the perceived depth of a scene is great. For this reason, the number of perceived depth adjusting frames FrTi may be increased as the perceived depth becomes greater. A stereoscopic video processing apparatus having such a configuration will be described as a seventh embodiment of the present invention.

Figure 20:
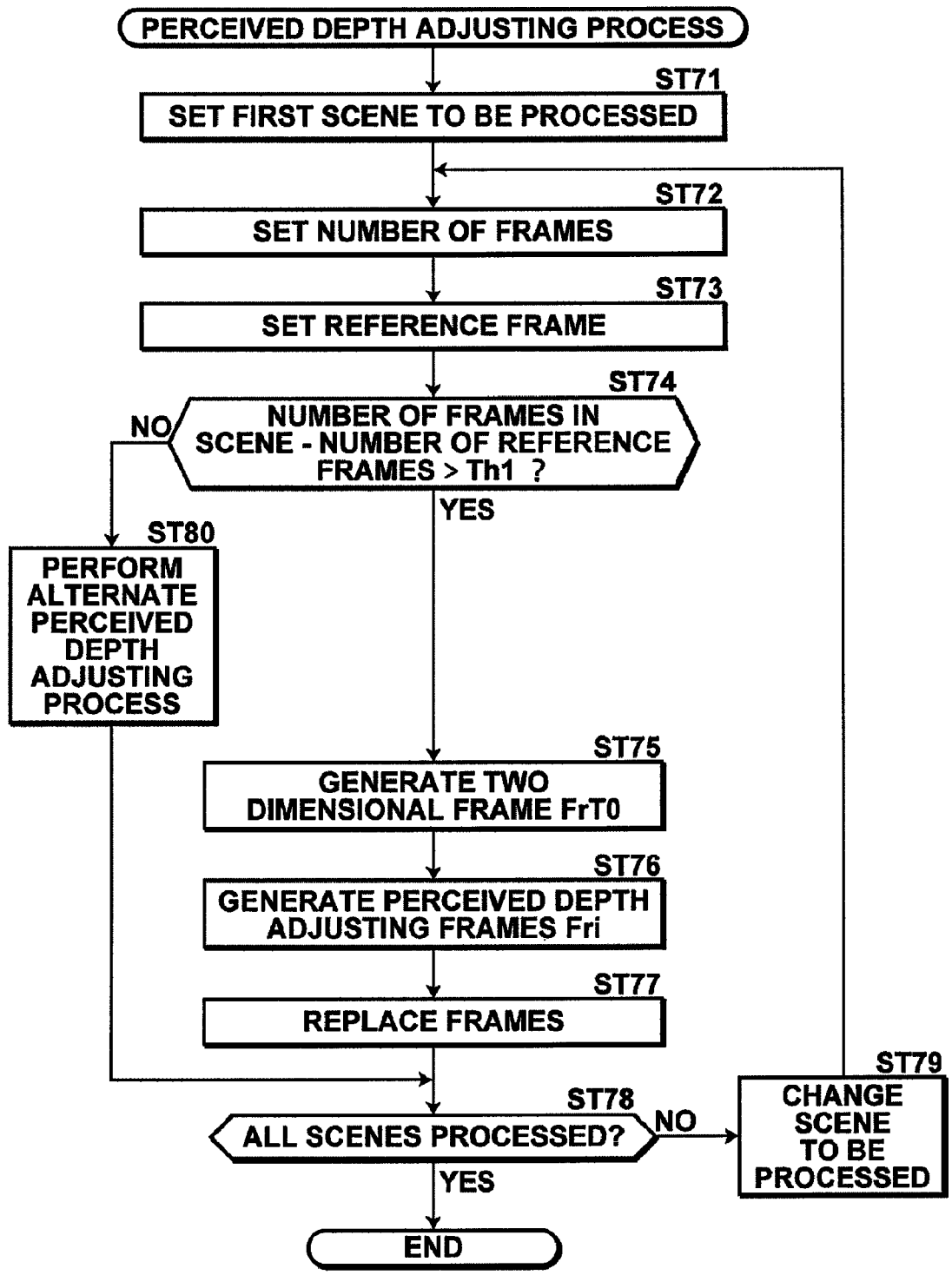
FIG. 20 is a flow chart that illustrates the steps of the perceived depth adjusting process administered by a stereoscopic video processing apparatus according to a seventh embodiment of the present invention.

FIG. 20 is a flow chart that illustrates the steps of the perceived depth adjusting process administered by the stereoscopic video processing apparatus of the seventh embodiment. The perceived depth adjusting section 4 sets a first scene to be processed (step ST71), and sets the number of perceived depth adjusting frames Fri according to the perceived depth of the scene to be processed (step ST72, SET NUMBER OF FRAMES). Next, the frame following the set number of frames from the leading frame FrT is designated to be a reference frame FrB (step ST73). Then, the perceived depth adjusting section 4 judges whether the difference in the number of frames of a scene to be processed and the number of frames from the leading frame FrT to the reference frame FrB (number of reference frames) is greater than or equal to a threshold value Th1 (step ST74). Note that the percentage of the number of reference frames with respect to the number of frames of the scene to be processed may be employed instead of the difference between the two. In the case that the result of judgment in step ST74 is affirmative, the perceived depth adjusting section 4 generates a two dimensional frame FrT0 that corresponds to the leading frame FrT of the scene to be processed (step ST75).

Next, the perceived depth adjusting section 4 generates the set number of perceived depth adjusting frames FrTi corresponding to the frames between the leading frame FrT and the reference frame FrB, in which the perceived depth changes continuously from that of the two dimensional frame FrT0 to that of the reference frame FrB (step ST76).

Then, the perceived depth adjusting section 4 replaces the frames from the leading frame FrT of the scene to be processed to a frame immediately preceding the reference frame FrB with the two dimensional frame FrT0 and the perceived depth adjusting frames FrTi (step ST77, REPLACE FRAMES).

Thereafter, the perceived depth adjusting section 4 judges whether processing of all scenes has been completed (step ST78). In the case that the result of judgment in step ST78 is negative, the scene to be processed is changed (step ST79), and the process returns to step ST72. In the case that the result of judgment in step ST78 is affirmative, the perceived depth adjusting process ends.

Note that in the case that the result of judgment in step ST75 is negative, an alternate perceived depth adjusting process is administered (step ST80), and the process proceeds to step ST78. The alternative perceived depth adjusting process may be that described in any one of the first through fourth embodiments. Note that a perceived depth adjusting process may not be performed in the case that the result of judgment in step ST75 is negative.

Figure 21:
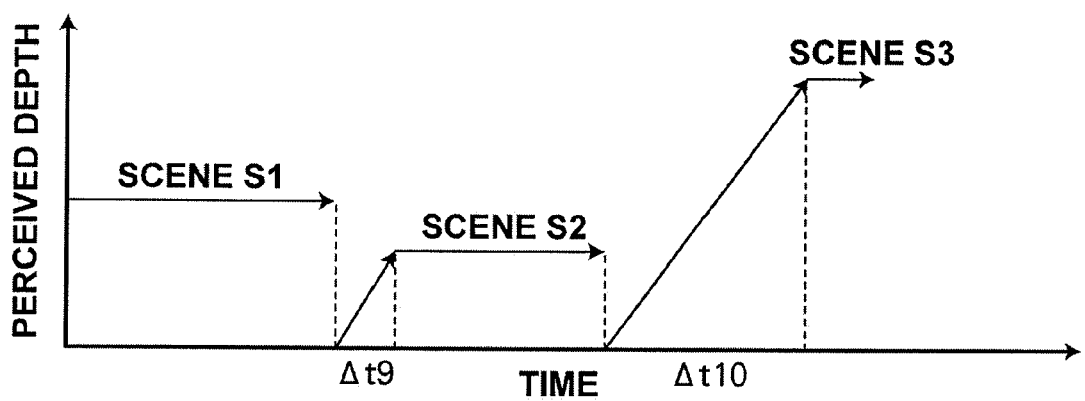
FIG. 21 is a graph that illustrates the perceived depths of a processed stereoscopic video generated by the stereoscopic video processing apparatus of the seventh embodiment.

FIG. 21 is a graph that illustrates the perceived depths of a processed stereoscopic video M1 which is generated by the stereoscopic video processing apparatus of the seventh embodiment. As illustrated in FIG. 21, the perceived depths change gradually at the start position of each scene, from a perceived depth value of 0 to the perceived depth of the reference frame FrB, by the frames from the leading frame FrT to a frame immediately preceding the reference frame FrB being replaced with two dimensional frames FrT0 and numbers of perceived adjusting frames FrTi, in scenes S1 through S3 of the processed stereoscopic video M1. The number of perceived depth adjusting frames FrTi that replace existing frames increases as the perceived depth of a scene is greater. Therefore, the two dimensional frames FrT0 and the perceived depth adjusting frames FrTi are displayed for amounts of time Δt9 and Δt10 corresponding to the numbers of frames that replace the original frames of the scenes. Note that Δt10>Δt9, because scene S3 has a greater perceived depth than scene S2. No additional frames are inserted into each scene, and therefore the playback time of the processed stereoscopic video M1 is the same as that of the stereoscopic video M0.

Drastic changes in perceived depths at scene changes are prevented, by increasing the number of perceived depth adjusting frames as the perceived depth of scenes become greater. Therefore, fatigue of viewers who view the processed stereoscopic video M1 three dimensionally can be reduced further.

Note that in the sixth embodiment described above as well, the number of perceived depth adjusting frames Frci can be increased as the difference in the perceived depth of the last frame FrL of a scene preceding a scene to be processed and the perceived depth of a scene to be processed becomes greater, as in the seventh embodiment. A stereoscopic video processing apparatus having such a configuration will be described as an eighth embodiment of the present invention.

Figure 22:
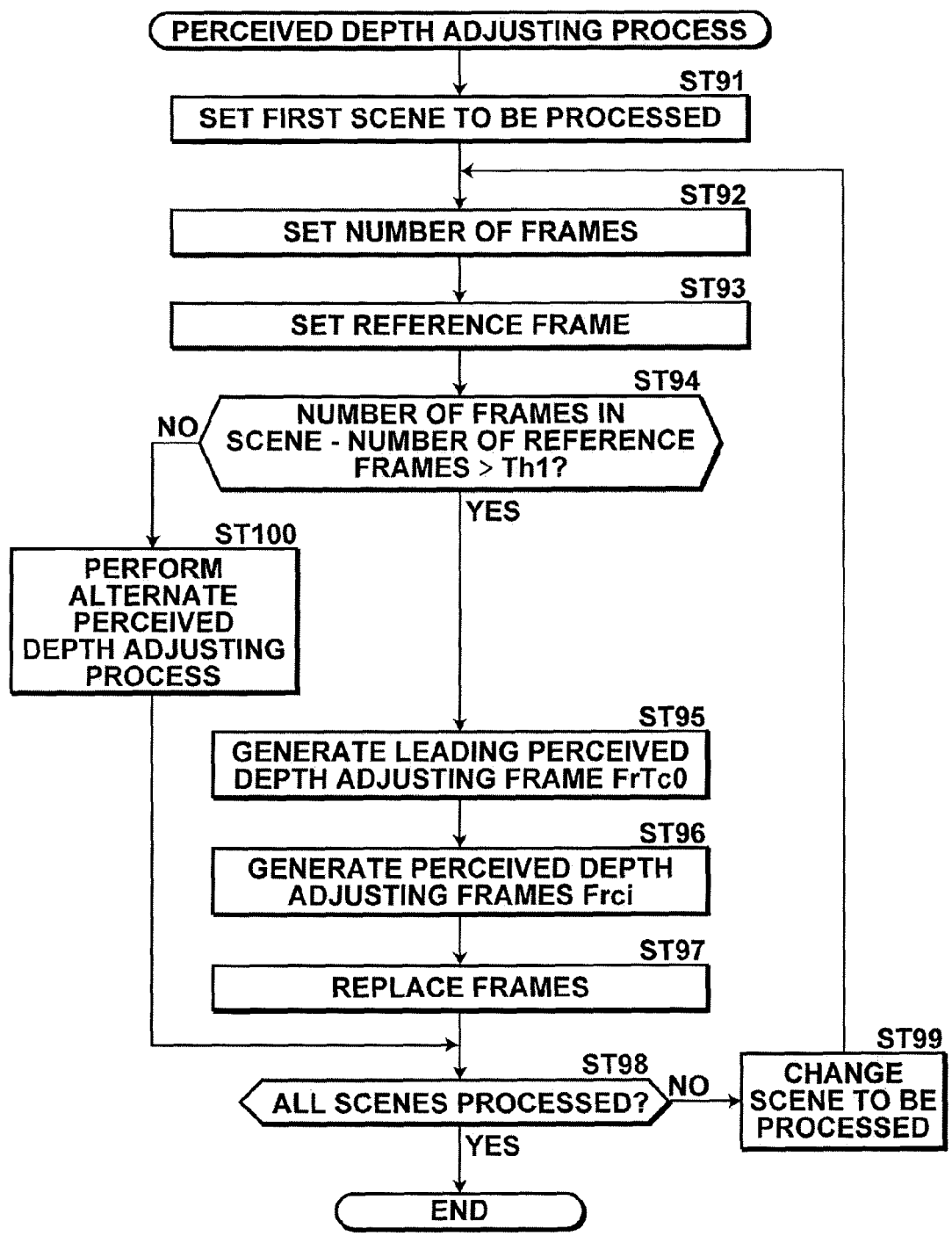
FIG. 22 is a flow chart that illustrates the steps of the perceived depth adjusting process administered by the stereoscopic video processing apparatus according to an eighth embodiment of the present invention.

FIG. 22 is a flow chart that illustrates the steps of the perceived depth adjusting process administered by the stereoscopic video processing apparatus of the eighth embodiment. The perceived depth adjusting section 4 sets a first scene to be processed (step ST91), and sets the number of perceived depth adjusting frames Fri according to the perceived depth of the scene to be processed (step ST92, SET NUMBER OF FRAMES). Next, the frame following the set number of frames from the leading frame FrT is designated to be a reference frame FrB (step ST93). Then, the perceived depth adjusting section 4 judges whether the difference in the number of frames of a scene to be processed and the number of frames from the leading frame FrT to the reference frame FrB (number of reference frames) is greater than or equal to a threshold value Th1 (step ST94). Note that the percentage of the number of reference frames with respect to the number of frames of the scene to be processed may be employed instead of the difference between the two. In the case that the result of judgment in step ST94 is affirmative, the perceived depth adjusting section 4 generates a leading perceived depth adjusting frame FrTc0 corresponding to the leading frame FrT of the scene to be processed (step ST95).

Next, the perceived depth adjusting section 4 generates the set number of perceived depth adjusting frames Frci corresponding to the frames between the leading frame FrT and the reference frame FrB, in which the perceived depth changes continuously from that of the leading perceived depth adjusting frame FrTc0 to that of the reference frame FrB (step ST96). Then, the perceived depth adjusting section 4 replaces the frames from the leading frame FrT of the scene to be processed to a frame immediately preceding the reference frame FrB with the leading perceived depth adjusting frame FrTc0 and the perceived depth adjusting frames Frci (step ST97, REPLACE FRAMES).

Thereafter, the perceived depth adjusting section 4 judges whether processing of all scenes has been completed (step ST98). In the case that the result of judgment in step ST98 is negative, the scene to be processed is changed (step ST99), and the process returns to step ST92. In the case that the result of judgment in step ST98 is affirmative, the perceived depth adjusting process ends.

Note that in the case that the result of judgment in step ST95 is negative, an alternate perceived depth adjusting process is administered (step ST100), and the process proceeds to step ST98. The alternative perceived depth adjusting process may be that described in any one of the first through fourth embodiments. Note that a perceived depth adjusting process may not be performed in the case that the result of judgment in step ST95 is negative.

Figure 23:
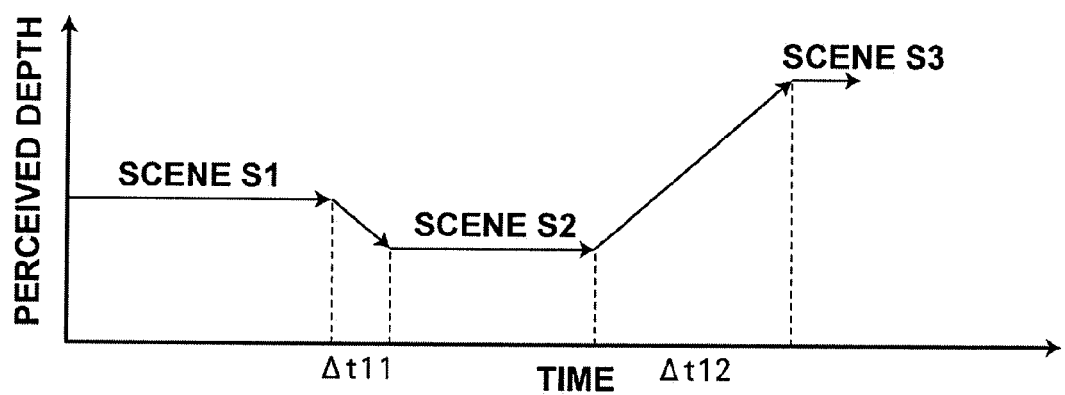
FIG. 23 is a graph that illustrates the perceived depths of a processed stereoscopic video M1 generated by the stereoscopic video processing apparatus of the eighth embodiment.

FIG. 23 is a graph that illustrates the perceived depths of a processed stereoscopic video M1 which is generated by the stereoscopic video processing apparatus of the eighth embodiment. As illustrated in FIG. 23, the perceived depths change gradually at the start position of each scene, from a perceived depth value of a preceding scene to the perceived depth of the reference frame FrB, by the frames from the leading frame FrT to a frame immediately preceding the reference frame FrB being replaced with leading perceived depth adjusting frames FrTc0 and numbers of perceived adjusting frames Frci, in scenes S1 through S3 of the processed stereoscopic video M1. The number of perceived depth adjusting frames Frci that replace existing frames increases as the perceived depth of a scene is greater. Therefore, the leading perceived depth adjusting frames FrTc0 and the perceived depth adjusting frames Frci are displayed for amounts of time Δt11 and Δt12 corresponding to the numbers of frames that replace the original frames of the scenes. Note that Δt12>Δt11, because scene S3 has a greater perceived depth than scene S2. No additional frames are inserted into each scene, and therefore the playback time of the processed stereoscopic video M1 is the same as that of the stereoscopic video M0.

Note that in the stereoscopic video processing apparatuses of the second and fourth embodiments described above, the leading perceived depth adjusting frame FrTc0 and the perceived depth adjusting frames FrTci are generated with respect to the leading frame FrT of a scene to be processed. Alternatively, the leading perceived depth adjusting frame FrTc0 and the perceived depth adjusting frames FrTci may be generated with respect to the last frame FrL of a scene preceding the scene to be processed, instead of the leading frame FrT of the scene to be processed. The leading perceived depth adjusting frame FrTc0 and the perceived depth adjusting frames FrTci, in which the perceived depth changes continuously to that of the leading frame FrT of the scene to be processed may be inserted between scenes. In this case, after playback of a scene is completed, the perceived depth of the last frame FrL thereof gradually changes until it becomes that of the leading frame FrT of a following scene. When the perceived depth becomes that of the leading frame FrT of the next scene, playback of the next scene is initiated.

In the embodiments described above, the two dimensional frames FrT0 and the leading perceived depth adjusting frames FrTc0 are generated by processing leading frames FrT or last frames FrL by morphing processes or the like. However, a stereoscopic video M0 is a plurality of videos which are combined such that they can be viewed three dimensionally. Therefore, if the plurality of videos prior to being combined are input to the stereoscopic video processing apparatus 1 along with the stereoscopic videos, a video prior to being combined may be employed to generate the two dimensional frame.

Embodiments of the stereoscopic video processing apparatus have been described above. Programs that cause computers to function as the scene detecting section 3 and the perceived depth adjusting section 4 described above, to perform the processes illustrated in FIGS. 5, 6, 9, 10, 12, 16, 19, 20, and 22 are also embodiments of the present invention. In addition, computer readable media having such programs recorded therein are also embodiments of the present invention.

What is claimed is:

1. A stereoscopic video processing apparatus, comprising:
   a video input unit, for receiving input of stereoscopic videos constituted by a plurality of frames, which are viewable stereoscopically;
   a scene detecting unit, for detecting positions within the stereoscopic videos at which scene changes occur; and
   a perceived depth adjusting unit, for administering a perceived depth adjusting process comprising the steps of:
   displaying a leading perceived depth adjusting frame corresponding to the leading frame of a scene to be processed or the last frame of a preceding scene and having a perceived depth corresponding to that of the last frame, following display of the last frame of a preceding scene;
   displaying a number of perceived depth adjusting frames, in which the perceived depth changes continuously from that of the leading perceived depth adjusting frame to that of the leading frame; and
   displaying the leading frame and the frames following thereafter, after the perceived depth adjusting frames are displayed, to generate processed stereoscopic videos.

2. A stereoscopic video processing apparatus as defined in claim 1, wherein: the perceived depth adjusting unit increases the number of perceived depth adjusting frames as the difference in perceived depths of the last frame and the leading frame is greater.

3. A stereoscopic video processing method, comprising the steps of:
   receiving input of stereoscopic videos constituted by a plurality of frames; which are viewable stereoscopically;
   detecting positions within the stereoscopic videos at which scene changes occur; and
   administering a perceived depth adjusting process comprising the steps of:
   displaying a leading perceived depth adjusting frame corresponding to the leading frame of a scene to be processed or the last frame of a preceding scene and having a perceived depth corresponding to that of the last scene, following display of the last frame of a preceding scene;
   displaying a number of perceived depth adjusting frames, in which the perceived depth changes continuously from that of the leading depth adjusting frame to that of the leading frame; and
   displaying the leading frame and the frames following thereafter, after the perceived depth adjusting frame are displayed, to generate processed stereoscopic videos.

4. A stereoscopic video processing program that causes a computer to execute the procedures of:
   receiving input of stereoscopic videos constituted by a plurality of frames, which are viewable stereoscopically;
   detecting positions within the stereoscopic videos at which scene changes occur; and
   administering a perceived depth adjusting process comprising the steps of:
   displaying a leading perceived depth adjusting frame corresponding to the leading frame of a scene to be processed or the last frame of a preceding scene and having a perceived depth corresponding to that of the last scene, following display of the last frame of a preceding scene;
   displaying a number of perceived depth adjusting frames, in which the perceived depth changes continuously from that of the leading depth adjusting frame to that of the leading frame; and
   displaying the leading frame and the frames following thereafter, after the perceived depth adjusting frame are displayed, to generate processed stereoscopic videos.

5. A stereoscopic video processing apparatus comprising:
   a video input unit, for receiving input of stereoscopic videos constituted by a plurality of frames, which are viewable stereoscopically;
   a scene detecting unit, for detecting positions within the stereoscopic videos at which scene changes occur; and
   a perceived depth adjusting unit, for administering a perceived depth adjusting process comprising the steps of:
   displaying a leading perceived depth adjusting frame corresponding to the leading frame of a scene to be processed and having a perceived depth of that of the last frame of a preceding scene following display of the last frame;
   displaying a number of perceived depth adjusting frames, in which the perceived depth changes continuously from that of the leading perceived depth adjusting frame to a reference frame in the scene to be processed, the number of perceived depth adjusting frames corresponding to the number of frames between the leading frame and the reference frame; and
   displaying the reference frame and the frames following thereafter, after the perceived depth adjusting frames are displayed;
   the perceived depth adjusting unit determining whether to administer the perceived depth adjusting process on the scene to be processed, according to comparison results between the number of frames in the scene to be processed, and the number of frames between the leading frame and the reference frame.

6. A stereoscopic video processing apparatus as defined in claim 5, wherein:
   the perceived depth adjusting unit increases the number of frames between the leading frame and the reference frame as the difference in the perceived depths of the last frame and the leading frame is greater.

7. A stereoscopic video processing apparatus as defined in claim 6, wherein:
   the perceived depth adjusting unit administers the perceived depth adjusting process in the case that the difference between the number of frames within the scene to be processed and the number of frames from the leading frame to the reference frame is greater than a predetermined threshold value, and administers another perceived depth adjusting process, comprising the steps of:
   displaying a leading perceived depth adjusting frame corresponding to the leading frame of a scene to be processed or the last frame of a preceding scene and having a perceived depth corresponding to that of the last frame, following display of the last frame of a preceding scene;
   displaying a number of perceived depth adjusting frames, in which the perceived depth changes continuously from that of the leading perceived depth adjusting frame to that of the leading frame; and displaying the leading frame and the frames following thereafter, after the perceived depth adjusting frames are displayed, to adjust the perceived depth of the stereoscopic videos in the case that the difference is the predetermined threshold value or less.

8. A stereoscopic video processing apparatus as defined in claim 7, wherein:

the perceived depth adjusting unit administers the other perceived depth adjusting process such that the number of perceived depth adjusting frames is increased as the difference in perceived depths of the last frame and the leading frame is greater.

9. A stereoscopic video processing method, comprising the steps of:

receiving input of stereoscopic videos constituted by a plurality of frames, which are viewable stereoscopically;

detecting positions within the stereoscopic videos at which scene changes occur; and administering a perceived depth adjusting process comprising the steps of:

displaying a leading perceived depth adjusting frame corresponding to the leading frame of a scene to be processed, having a perceived depth corresponding to the perceived depth of the last frame of a preceding scene, following display of the last frame of a preceding scene;

displaying a number of perceived depth adjusting frames, in which the perceived depth changes continuously from that of the leading perceived depth adjusting frame to a reference frame in the scene to be processed, the number of perceived depth adjusting frames corresponding to the number of frames between the leading frame and the reference frame; and displaying the reference frame and the frames following thereafter, after the perceived depth adjusting frames are displayed, to generate a processed stereoscopic video;

whether to administer the perceived depth adjusting process on the scene to be processed being determined according to comparison results between the number of frames in the scene to be processed, and the number of frames between the leading frame and the reference frame.

10. A stereoscopic video processing program that causes a computer to execute the procedures of:

receiving input of stereoscopic videos constituted by a plurality of frames, which are viewable stereoscopically;

detecting positions within the stereoscopic videos at which scene changes occur; and administering a perceived depth adjusting process comprising the steps of:

displaying a leading perceived depth adjusting frame corresponding to the leading frame of a scene to be processed, having a perceived depth corresponding to the perceived depth of the last frame of a preceding scene, following display of the last frame of a preceding scene;

displaying a number of perceived depth adjusting frames, in which the perceived depth changes continuously from that of the leading perceived depth adjusting frame to a reference frame in the scene to be processed, the number of perceived depth adjusting frames corresponding to the number of frames between the leading frame and the reference frame; and displaying the reference frame and the frames following thereafter, after the perceived depth adjusting frames are displayed, to generate a processed stereoscopic video;

whether to administer the perceived depth adjusting process on the scene to be processed being determined according to comparison results between the number of frames in the scene to be processed, and the number of frames between the leading frame and the reference frame.

11. A stereoscopic video processing apparatus comprising:

a video input unit, for receiving input of stereoscopic videos constituted by a plurality of frames, which are viewable stereoscopically;

a scene detecting unit, for detecting positions within the stereoscopic videos at which scene changes occur; and a perceived depth adjusting unit, for administering a perceived depth adjusting process comprising the steps of:

displaying a two dimensional frame corresponding to the leading frame of a scene to be processed following display of the last frame of a preceding scene;

displaying a number of perceived depth adjusting frames, in which the perceived depth changes continuously from that of the two dimensional frame to that of a reference frame in the scene to be processed; and displaying the reference frame and the frames following thereafter, after the perceived depth adjusting frames are displayed;

the perceived depth adjusting unit determining whether to administer the perceived depth adjusting process on the scene to be processed, according to comparison results between the number of frames in the scene to be processed, and the number of frames between the leading frame and the reference frame.

12. A stereoscopic video processing apparatus as defined in claim 11, wherein:

the perceived depth adjusting unit increases the number of frames from the leading frame to the reference frame as the perceived depth of the leading frame is greater.

13. A stereoscopic video processing apparatus as defined in claim 11 or 12, wherein:

the perceived depth adjusting unit administers the perceived depth adjusting process in the case that the difference between the number of frames within the scene to be processed and the number of frames from the leading frame to the reference frame is greater than a predetermined threshold value, and administers another perceived depth adjusting process, comprising the steps of:

displaying a two dimensional frame corresponding to the leading frame of a scene to be processed, following display of the last frame of a preceding scene;

displaying a number of perceived depth adjusting frames, in which the perceived depth changes continuously from that of the two dimensional frame to that of the leading frame; and displaying the leading frame and the frames following thereafter, after the perceived depth adjusting frames are displayed, to adjust the perceived depth of the stereoscopic videos in the case that the difference is the predetermined threshold value or less.

14. A stereoscopic video processing apparatus as defined in claim 13, wherein:

the perceived depth adjusting unit administers the other perceived depth adjusting process such that the number of perceived depth adjusting frames is increased as the perceived depth of the leading frame is greater.

15. A stereoscopic video processing method, comprising the steps of:

receiving input of stereoscopic videos constituted by a plurality of frames, which are viewable stereoscopically;

detecting positions within the stereoscopic videos at which scene changes occur; and administering a perceived depth adjusting process comprising the steps of:

displaying a two dimensional frame corresponding to the leading frame of a scene to be processed following display of the last frame of a preceding scene;

displaying a number of perceived depth adjusting frames, in which the perceived depth changes continuously from that of the two dimensional frame to that of a reference frame in the scene to be processed; and displaying the reference frame and the frames following thereafter, after the perceived depth adjusting frames are displayed;

whether to administer the perceived depth adjusting process on the scene to be processed being determined according to comparison results between the number of frames in the scene to be processed, and the number of frames between the leading frame and the reference frame.

16. A stereoscopic video processing program that causes a computer to execute the procedure of:

receiving input of stereoscopic videos constituted by a plurality of frames, which are viewable stereoscopically;

detecting positions within the stereoscopic videos at which scene changes occur; and administering a perceived depth adjusting process comprising the steps of:

displaying a two dimensional frame corresponding to the leading frame of a scene to be processed following display of the last frame of a preceding scene;

displaying a number of perceived depth adjusting frames, in which the perceived depth changes continuously from that of the two dimensional frame to that of a reference frame in the scene to be processed; and displaying the reference frame and the frames following thereafter, after the perceived depth adjusting frames are displayed;

whether to administer the perceived depth adjusting process on the scene to be processed being determined according to comparison results between the number of frames in the scene to be processed, and the number of frames between the leading frame and the reference frame.

\* \* \* \* \*